(12) United States Patent
Hildenbrand

(10) Patent No.: US 11,893,408 B2
(45) Date of Patent: Feb. 6, 2024

(54) PROTECTION OF BALLOON INFLATED MEMORY USING TEMPORARY LOAN PAGES

(71) Applicant: Red Hat, Inc., Raleigh, NC (US)

(72) Inventor: David Hildenbrand, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 474 days.

(21) Appl. No.: 17/106,523

(22) Filed: Nov. 30, 2020

(65) Prior Publication Data

US 2022/0171644 A1 Jun. 2, 2022

(51) Int. Cl.
*G06F 9/455* (2018.01)

(52) U.S. Cl.
CPC .......... *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,583,875 B1 * | 11/2013 | Garthwaite | G06F 12/08 711/6 |
| 9,280,458 B2 | 3/2016 | Durrant | |
| 9,459,900 B2 | 10/2016 | Tsirkin | |
| 10,228,864 B1 * | 3/2019 | Zelenov | G06F 3/0685 |
| 11,231,955 B1 * | 1/2022 | Shahane | G06F 9/5022 |
| 2019/0065276 A1 * | 2/2019 | van Riel | G06F 9/5077 |
| 2019/0171473 A1 * | 6/2019 | Hildenbrand | G06F 9/45558 |
| 2020/0026443 A1 * | 1/2020 | Prasad | G06F 3/0665 |
| 2021/0011855 A1 * | 1/2021 | Charan | G06F 3/0683 |
| 2021/0073033 A1 * | 3/2021 | Gaonkar | G06F 9/5016 |

OTHER PUBLICATIONS

Fei Guo, VMware, Inc.; "Understanding Memory Resource Management in VMware vSphere® 5.0" pp. 1-29, Aug. 24, 2011, Palo Alto CA, 29 Pages.

* cited by examiner

*Primary Examiner* — Wynuel S Aquino
(74) *Attorney, Agent, or Firm* — K&L Gates LLP

(57) ABSTRACT

A system includes a guest memory having guest physical pages ("GPPs") that includes loan pages having a fixed quantity, a host memory, a processor in communication with the memory, and a virtual machine monitor ("VMM"). The VMM is configured to track a respective state (inflated or deflated) for each respective GPP. Additionally, the VMM is configured to track a respective status (in-use or unused) of each loan page, determine that each respective loan page is in-use, un-assign a first loan page from a corresponding GPP, discard the first loan page thereby changing the first loan page from in-use to unused, and assign the unused first loan page to a first GPP that is inflated, such that the first loan page's status updates to in-use. Each respective GPP having an inflated state is temporarily backed by the fixed quantity of loan pages.

20 Claims, 8 Drawing Sheets

PROTECTION OF BALLOON INFLATED MEMORY USING TEMPORARY LOAN PAGES

BACKGROUND

The present disclosure relates generally to memory management of virtual machines. Virtualization may be used to provide some physical components as logical objects in order to allow running various software modules, for example, multiple operating systems, concurrently and in isolation from other software modules, on one or more interconnected physical computer systems. Virtualization may be achieved by running a software layer, often referred to as a virtual machine monitor or a hypervisor, above the hardware and below the virtual machines.

Computer systems may run virtual machines with memory allocated by the hypervisor. With memory overcommit, virtual machines and their associated guest operating systems may operate as if that they have access to more memory than is actually assigned by the hypervisor. For example, memory overcommit (or overcommitment) is a hypervisor feature that allows a virtual machine, in effect, to use more memory space than the physical host has available. To achieve memory overcommit, the hypervisor may reallocate memory by adding and/or removing memory from other virtual machines as physical memory permits. When a guest operating system (OS) needs additional memory, the guest OS may use various techniques to free up additional memory. Additionally, a guest OS may return memory to the hypervisor through a ballooning process.

SUMMARY

The present disclosure provides new and innovative systems and methods for protecting inflated memory (e.g., balloon inflated memory) using temporary loan pages. In an example, a method includes tracking, by a virtual machine monitor ("VMM"), a respective state for each respective page of a plurality of guest physical pages ("GPPs") of a guest memory. The respective state is one of inflated and deflated, and the plurality of GPPs includes a plurality of loan pages that has a fixed quantity. Additionally, the method includes tracking, by the VMM, a respective status of each of the plurality of loan pages. Each respective loan page of the plurality of loan pages has a status of one of in-use and unused. The method also includes determining, by the VMM, that each respective loan page of the plurality of loan pages is in-use. Responsive to determining that each respective loan page has an in-use status, the method includes un-assigning, by the VMM, a first loan page of the plurality of loan pages from a corresponding GPP of the plurality of GPPs. Additionally, the method includes discarding, by the VMM, the first loan page thereby changing the first loan page from having an in-use status to having an unused status. The method also includes assigning, by the VMM, the first loan page having the unused status to a first GPP that is inflated, such that the first loan page's status updates to in-use. Each respective page of the plurality of GPPs having an inflated state are temporarily backed by the plurality of loan pages having the fixed quantity.

In an example, a system includes a guest memory having a plurality of GPPs that includes a plurality of loan pages. The plurality of loan pages has a fixed quantity. The system also includes a host memory, at least one processor in communication with the guest memory and the host memory, and a VMM. The VMM is configured to track a respective state for each respective page of the plurality of GPPs of the guest memory. The respective state is one of inflated and deflated. Additionally, the VMM is configured to track a respective status of each of the plurality of loan pages. Each respective loan page of the plurality of loan pages has a status of one of in-use and unused. The VMM is also configured to determine that each respective loan page of the plurality of loan pages is in-use. Responsive to determining that each respective loan page has an in-use status, the VMM is configured to un-assign a first loan page of the plurality of loan pages from a corresponding GPP of the plurality of GPPs. Additionally, the VMM is configured to discard the first loan page thereby changing the first loan page from in-use to unused, and assign the first loan page having the unused status to a first GPP that is inflated, such that the first loan page's status updates to in-use. Each respective page of the plurality of GPPs having an inflated state are temporarily backed by the plurality of loan pages having the fixed quantity.

In an example, a system includes a guest memory having a plurality of GPPs. The plurality of GPPs includes at least one loan page, and the at least one loan page has a fixed quantity. The system also includes a guest operating system ("OS"), at least one processor in communication with the guest memory, and a hypervisor. The hypervisor is configured to store a guest physical address ("GPA") for each respective loan page having a status of in-use. The GPA is mapped to a corresponding virtual address, and each respective loan page of the at least one loan page has a status of one of in-use and unused. Responsive to a page fault being reported by the guest OS for a first GPP of the plurality of GPPs, the hypervisor is configured to determine a state of the first GPP. Responsive to determining the state of the first GPP as deflated, the hypervisor is configured to place a first fresh page for the first GPP. Responsive to determining the state of the first GPP as inflated, the hypervisor is configured to locate an unused loan page from the at least one loan page (or potentially free up a used loan page by discarding the used loan page, which frees up the loan page and changes the loan page to an unused loan page). Additionally, responsive to locating the unused loan page, the hypervisor is configured to associate a respective GPA with the unused loan page and place a second fresh page. Each respective GPP having an inflated state is temporarily backed by a respective loan page.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
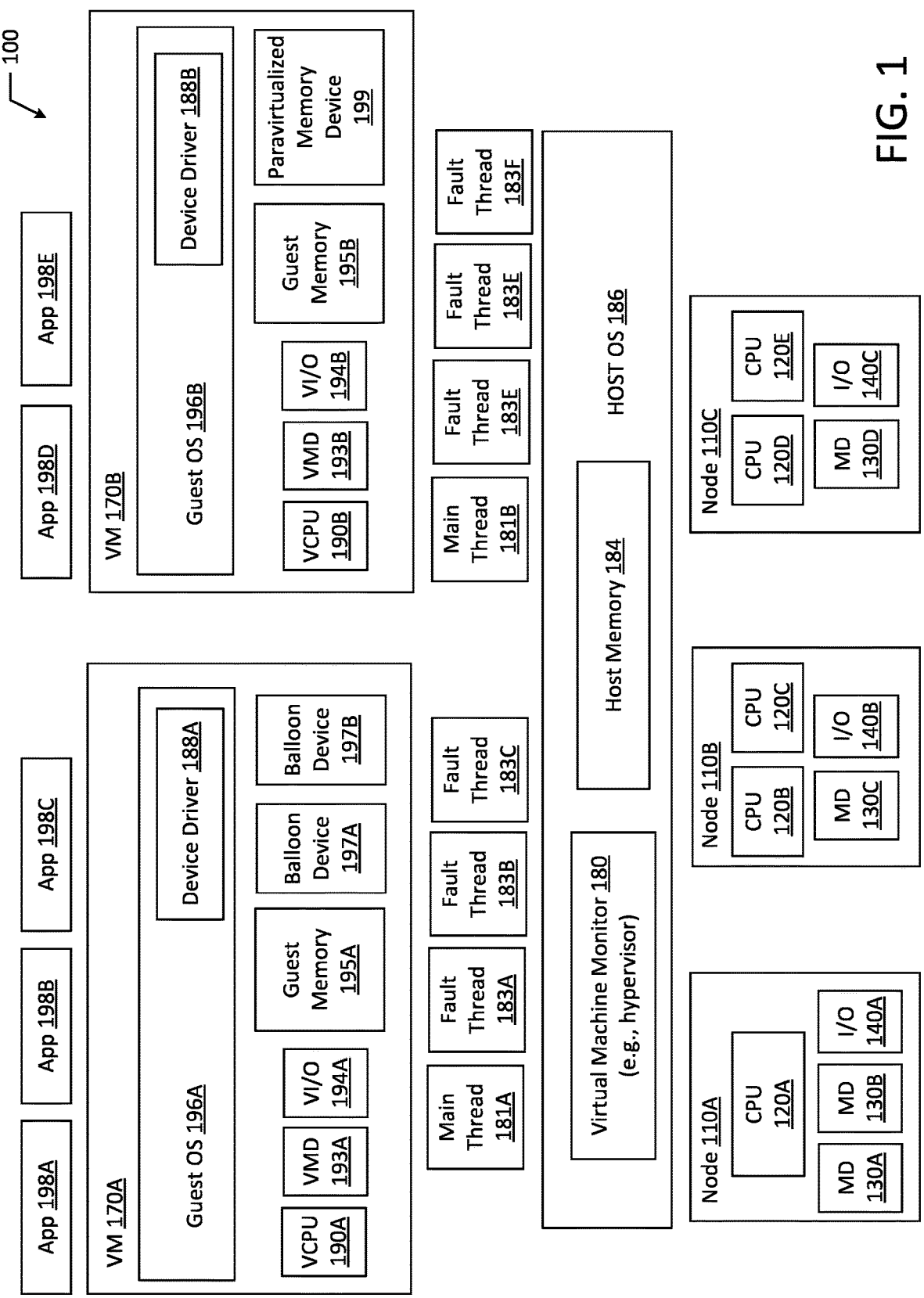
FIG. 1 illustrates a block diagram of an example computing system according to an example embodiment of the present disclosure.

Techniques are disclosed for protecting inflated memory (e.g., memory that is unplugged and returned to a virtual machine monitor, such as a hypervisor) using temporary loan pages. Ballooning is often used to unplug memory from a virtual machine. When requested by a hypervisor, a guest may inflate a balloon, thereby handing back unused memory to the hypervisor. With paravirtualized memory devices that perform reverse ballooning, all device memory may initially be inflated, and the guest deflates a device balloon on request for additional memory. Once unplugged, the unplugged memory (e.g., memory handed back to the hypervisor) should no longer be used by the guest. Specifically, unplugged memory should not be written to by the guest.

However, malicious guests may still use (e.g., read and write) the unplugged memory, thereby consuming more memory than requested by the hypervisor. For example, even though a memory page may be recorded as inflated, the guest may still continue using the inflated page. The malicious guest along with corrupted guests (e.g., guests that have a bug) may continually access or use (e.g., read and write) the unplugged memory, which may cause the VM to crash. Detecting conditions where a guest is still using inflated pages is difficult. Specifically, detecting such conditions in the hypervisor is difficult, especially for type 1 hypervisors, which mostly rely on ordinary operating system ("OS") interfaces or system calls, such as "madvise( )" to manage the hypervisor's virtual memory (and therefore guest memory). A type 1 hypervisor may be a bare-metal hypervisor that runs directly on the hardware and that hosts guest operating systems.

For example, the "madvise( )" system call provides information or advice about the use of memory. Specifically, the "madvise( )" system call allows a device or process that has knowledge of its memory behavior to describe that behavior to the system. The "madvise( )" system call may advise a kernel how to handle paging input/output in a specific address range (e.g., an address range beginning at an address with a specified size or length of n bytes). For example, the system call may allow a process or application to describe how the process or application expects to use some mapped or shared memory areas.

Aside from the malicious guests or corrupted guests discussed above, other guests may also read inflated memory. For example, when taking a system dump (also referred to as a core dump, memory dump and crash dump), which consists of the recorded state of the working memory of a computer program at a specific time (e.g., generally when the program has crashed or otherwise terminated abnormally, a guest may continue to read inflated memory. For example, during a system dump, key pieces of program state may be dumped including processor registers, program counters, stack pointers, memory management information, etc. In some scenarios, the guest may continue reading, writing and executing inflated memory because the guest may fail to deflate first on reboot.

The hypervisor also may exhibit problematic tendencies regarding unplugged memory. For example, the hypervisor may read inflated memory when creating a virtual machine ("VM") dump or when migrating the VM. The hypervisor may also write to inflated memory, for example, using a VM debugging interface (e.g., gdbserver, which is built into Quick Emulator ("QEMU")). QEMU is a generic and open source machine emulator and virtualizer that performs hardware virtualization and gdbserver is a control program, which allows remote debugging of other programs. QEMU emulates a machine's processor through dynamic binary translation and provides a set of different hardware and device models for the machine, enabling the machine to run a variety of guest operating systems. QEMU can also be used with the Kernel-based Virtual Machine ("KVM") to run virtual machines and near-native speed. Similar to the malicious or buggy guests, the hypervisor using (e.g., reading and writing) the unplugged memory may also cause a VM to crash.

The problems discussed above are even more critical when huge pages are used for backing a guest. For example, huge pages typically require huge page ballooning, and the act of reading inflated memory may result in huge memory pages getting allocated and additional memory inadvertently getting consumed. Furthermore, using huge pages of unplugged memory increases the amount of memory over-consumption that can occur from malicious guests, which can severely cripple a system and crash the VMs of the system. Physical memory is typically segmented into a series of contiguous regions called pages and each page contains a number of bytes, referred to as the page size. In an example, the standard page size in an x86 system is 4 kb. The standard page size of 4 kb may be an optimal page size to perform general purpose computing. Larger pages, with sizes ranging from 1 MB to 1 GB and beyond are known as huge pages. Typically, huge pages result in less efficient memory usage as a process may not use all the memory available in each page. It should be appreciated that the difference in size between a standard page and a huge page may differ based on system architecture. For example, standard pages may be 1 kb, 512 bytes, or 256 bytes.

One possible solution is to restrict access permissions to unplugged memory or inflated memory. For example, "mprotect( )" may be used to restrict access to inflated memory. Specifically, "mprotect( )" is a function that specifies the desired protection for memory pages(s). However, restricting access to unplugged or inflated memory (e.g., by using "mprotect( )") may harm system performance or may fail. For example, if there are a large quantity of virtual memory areas, "mprotect( )" may fail or consume too many system resources thereby harming system performance. For example, using "mprotect( )" on single pages often results in a large quantity of virtual memory areas ("VMAs") in the kernel, thereby degrading guest performance. Additionally, a kernel may have a VMA limit, so protection may eventually fail at one point. Furthermore, restricting access permissions to unplugged memory or inflated memory may reduce system stability, e.g., by causing a VM to crash. As noted above, the VM may crash because a guest is reading inflated memory (e.g., while taking a system dump) or because a hypervisor is reading inflated memory (e.g., while taking a VM dump).

Another potential solution is to keep inflated memory unprotected, review and monitor memory consumption of each VM, and kill a VM if the VM consumes too much memory. However, it is often difficult to reliably calculate the expected memory consumption of a VM (including the hypervisor overhead). Also, killing a VM is typically the only way to resolve overconsumption with this approach, which often leads to undesirable performance.

As described in the various example embodiments disclosed herein, to protect unplugged or inflated memory without the risk of harming system performance by restricting access permissions (e.g., by using "mprotect( )"), a hypervisor may be configured to track the state of each page of applicable guest memory. The hypervisor may track the state of each page of applicable guest memory in a bitmap (s). In the case of traditional ballooning, the applicable guest memory may encompass all of guest memory. In the case of paravirtualized memory devices, the applicable guest memory may correspond to device memory. By tracking the state of each page, the hypervisor knows which memory is deflated (e.g., safe to be used) and which memory is inflated (e.g., not safe to be used). Whenever memory is inflated or deflated by a guest, the states of the corresponding memory pages are updated in the bitmap.

When a memory page is inflated (e.g., inflated by a guest), the hypervisor initiates or triggers discarding memory corresponding to the inflated page. Discarding the memory corresponding to the inflated page results in the OS freeing the physical page assigned to or backing the inflated page. Therefore, on the next access to the address associated with the inflated page, a page fault is triggered in the OS.

The hypervisor also keeps track of loan page(s) (e.g., one or more loan pages). The quantity of loan pages is fixed. When a page fault is reported, if the page associated with the fault is deflated, the hypervisor may place a fresh page to handle the page fault. If the page associated with the fault is inflated, the hypervisor may locate an unused loan page and place a fresh page associated with the loan page to handle the page fault. Once all of the loan pages are in-use, the hypervisor may discard the loan page that has been backing an inflated page for the longest period of time, thereby turning that loan page to an unused page and freeing up the physical memory. Then, the loan page can be reassigned to handle the page fault. By doing so, the hypervisor enables both the guest and the hypervisor to read and write all guest memory, included inflated pages. However, the loan pages ensure that the inflated pages are only temporarily backed by a fixed quantity of physical loan pages, which results in writes to inflated pages eventually getting wiped and lost when the loan page is reused (e.g., when the loan page is discarded). The techniques discussed above advantageously allows systems to simulate fully accessible virtual memory areas with a restricted number of physical loan pages.

Virtualization may allow a host machine to run multiple virtual environments, for example using a hypervisor (e.g., Kernel-based Virtual Machine ("KVM")) on an operating system, such as Red Hat® Enterprise Linux® ("RHEL"). When handling memory, hypervisor vendors and operating system ("OS") vendors often attempt to improve efficiency and reduce overhead. An example vendor is Red Hat®, which offers RHEL. The present disclosure is especially advantageous for hypervisor vendors that may be interested in reducing memory overconsumption and other associated virtualization overhead. By implementing the solution above, a hypervisor vendor may provide optimized memory handling and reduce or eliminate memory overconsumption from hypervisors and guests that continue to access inflated memory pages. The memory overconsumption may waste valuable CPU resources and may ultimately crash the virtual machines running on the system.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

Virtual machines 170A-B may include a guest OS(s), guest memory or virtual machine memory, a virtual CPU (VCPU), virtual memory devices (VMD), and virtual input/output devices (VI/O). The virtual machines 170A-B may also include paravirtualized memory devices or balloon devices. Each guest OS may include instances of device drivers associated with the paravirtualized memory devices or balloon devices. For example, virtual machine 170A may include guest OS 196A, guest memory or virtual machine memory 195A, a virtual CPU 190A, a virtual memory devices 193A, a virtual input/output device 194A, and balloon devices 197A-B. Virtual machine memory or guest memory 195A may include one or more memory pages. Guest OS 196A may include device driver 188A associated with one or more of the balloon device(s) 197A-B.

Each balloon device 197A-B may be associated with a memory region (e.g., a start address and an end address in the memory region). Additionally, the balloon devices 197A-B may be virtual devices. In an example, each balloon device 197A-B may be associated with a respective node (e.g., nodes 110A-C). For example, balloon device 197A may be associated with node 110A and balloon device 197B may be associated with node 110B.

Similarly, virtual machine 170B may include guest OS 196B, guest memory or virtual machine memory 195B, a virtual CPU 190B, a virtual memory devices 193B, and virtual input/output device 194B, and paravirtualized memory device(s) 199. Virtual machine memory or guest memory 195B may include one or more memory pages. Guest OS 196B may include device driver 188B associated with paravirtualized memory device(s) 199.

A memory device may be a virtual memory device or a virtualized memory device. Additionally, a memory device may be a paravirtual device or a paravirtualized device (e.g., a paravirtualized memory device 199). Some paravirtualized devices decrease I/O latency and increase I/O throughput to near bare-metal (e.g., a bare-metal hypervisor or type 1 hypervisor that runs directly on the hardware and that hosts guest operating systems) levels, while other paravirtualized devices add functionality to virtual machines that is not otherwise available. Due to paravirtualized devices ability to decrease I/O latency and increase I/O throughput, paravirtualized devices (e.g., paravirtualized memory devices 199) may be better suited than emulated devices for virtual machines running I/O intensive applications. Paravirtualized memory devices 199 may be high-performance virtual storage devices that provide storage to virtual machines. Additionally, paravirtualized memory devices 199 may be associated with a virtual machine 170's RAM. In an example, a paravirtualized memory device 199 may have the ability to resize the virtual machine address space. As discussed in the present specification, and unless otherwise indicated, a memory device may refer to a physical memory device, a virtualized memory device, and/or a paravirtualized memory device, as would be understood by those skilled in the art.

As illustrated, each guest OS (e.g., guest OS 196A) may have a device driver (e.g., device driver 188A) associated with the balloon devices. In another example, the guest OS 196A may have dedicated instances of the device driver (e.g., device driver 188A) per balloon device 197A-B. Similarly, guest OS 196B may include a single device driver 188B for the paravirtualized memory device(s) 199 or the guest OS 196B may have dedicated instances of the device driver 188B for each paravirtualized memory device 199, such that if VM 170B includes three paravirtualized memory devices 199, the guest OS 196B would include three instances of the device driver 188B. Therefore, the device driver(s) 188A-B may manage multiple devices (e.g., balloon devices 197A-B or paravirtualized memory devices 199). Conversely, the device driver(s) 188A-B may manage single devices. In an example, the paravirtualized memory device(s) ("PMDs") 199 may include persistent memory, which may be accessed using memory instructions or memory APIs after the end of a process.

In an example, device driver 188A may be a virtIO-balloon driver. The virtIO-balloon driver, which may also be generally referred to as the device driver 188A, may be used to inflate balloon devices 197A-B, which then may be deflated to provide additional memory to the guest (e.g., guest OS 196A) when needed. The balloon driver may be configured to take guest memory and hand that memory back to the host (e.g., host OS 186 or VMM 180), thereby preventing the guest (e.g., guest OS 196A) from accessing the memory and allowing the memory to be reallocated by the VMM 180 or hypervisor.

The computing system 100 may also include a virtual machine monitor 180, such as a hypervisor, and host memory 184. For example, a hypervisor is one example of a virtual machine monitor 180, which may manage host memory 184 for the host operating system 186 as well as memory allocated to the virtual machines 170A-B and guest operating systems 196A-B such as guest memory or virtual machine memory ("VM memory") 195A-B provided to guest OS 196A-B. Host memory 184 and virtual machine memory 195A-B may be divided into a plurality of memory pages that are managed by the hypervisor or virtual machine monitor ("VMM") 180. Virtual machine memory 195A-B allocated to the guest OS 196A-B may be mapped from host memory 184 such that when a guest application 198A-E uses or accesses a memory page of virtual machine memory 195A-B, the guest application 198A-E is actually using or accessing host memory 184.

The VMM 180 may execute various threads such as main threads 181A-B and fault threads 183A-F. The threads, which are described in more detail in FIGS. 5A and 5B may perform various tasks and execute various operations for the VMM 180. In an example, the may be a main thread (e.g., main thread 181A) and a fault thread (e.g., fault thread 183A) or each respective balloon device (e.g., balloon device 197A) or paravirtualized memory device (e.g., paravirtualized memory device 199).

The VMM 180, such as a hypervisor, may control, account for, and limit memory allocation processes handled by the guest OS 196A-B or device driver 188A-B. When a guest (e.g., guest OS 196A-B) indicates that more memory is needed, the guest (e.g., guest OS 196A-B) may communicate with the VMM 180 (e.g., hypervisor). In an example, the guest (e.g., guest OS 196A-B) may communicate with PMDs 199 or VMM 180 via the device driver 188B to request more memory from the PMDs 199. For example, the PMDs may serve as potential candidates to fulfill a request for additional memory (e.g., an out-of-memory request).

For example, the (e.g., guest OS 196A-B or associated device driver 188A-B) may request to plug more memory chunks of device memory and make the newly granted physical memory usable by the guest. For example, unavailable memory may eventually become usable via plugging. As used herein, "unavailable" memory is memory that has not yet been made available for plugging. For example, first "unavailable" memory has to be made "unusable", which is available for plugging by the VMM 188 before it becomes "usable" memory, which can be used by the guest OS 196. For example, "unavailable" memory may become "unusable" memory, which may then be turned into "usable" memory by the guest OS 196 (e.g., via a plug request).

As used herein, "usable" memory is memory that is usable or made available to the guest OS (e.g., guest OS 196A-B). For example, initialization memory or memory used to initialize the virtual machine may be exposed to the guest OS 196 as "usable" memory that the guest uses to initialize. Additionally, device drivers 188 may add "usable" memory to the guest OS 196 from paravirtualized memory devices 199. Memory is "usable" as soon as the memory is plugged. For example, before the memory is reported to the guest OS 196, the memory is "usable" because the memory can be safely accessed. After the memory is plugged, the "usable" memory is reported to the guest OS 196. Reporting "unusable" or "unavailable" memory to the guest OS 196 may result in a system crash or failure.

Similarly, as used herein, "unusable" memory is memory that is currently not made available to the guest OS 196, but is available for plugging. For example, the memory of a paravirtualized memory device 199 is "unusable" memory to the guest OS 196 because the memory is not exposed to the guest OS 196 and thus the guest OS 196 is unable to use the memory. Once "unusable" memory is plugged, it becomes "usable" memory.

In an example, a virtual machine 170A may execute a guest operating system 196A and run applications 198A-C, which may utilize the underlying VCPU 190A, VMD 193A, and VI/O device 194A. A virtual machine (e.g., VM 170A-B, as illustrated in FIG. 1) may run on any type of dependent, independent, compatible, and/or incompatible applications on the underlying hardware and OS. In an example, applications (e.g., App 198A-C) running on VM 170A or guest OS 196A may be dependent on the underlying hardware and/or OS 186. In another example embodiment, applications 198A-C running on VM 170A or guest OS 196A may be independent of the underlying hardware and/or OS 186. For example, applications 198A-C may be dependent on the underlying hardware and/or OS 186 while application(s) 198D-E are independent of the underlying hardware and/or OS 186. Additionally, applications 198A-C may be compatible with the underlying hardware and/or OS 186. In another example embodiment, applications 198A-C may be incompatible with the underlying hardware and/or OS 186. For example, applications 198A-C running on one VM 170A may be compatible with the underlying hardware and/or OS 186 while application(s) 198D-E running on VM 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/ output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B. Nodes 110A-C may be non-uniform memory access ("NUMA") nodes.

In an example, device memory may be located on paravirtualized memory device(s) 199. Each paravirtualized memory device 199 may be associated with a memory region (e.g., a start address and an end address in the memory region). Additionally, each paravirtualized memory device 199 may be associated with a respective NUMA node (e.g., nodes 110A-C) or may be aware of the host's non-uniform memory access topology. For example, paravirtualized memory device 199 may be associated with node 110A while another paravirtualized memory device 199 may be associated with node 110B. In an example, the present systems and methods may be fully NUMA aware and are expected to be faster than existing balloon implementations.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
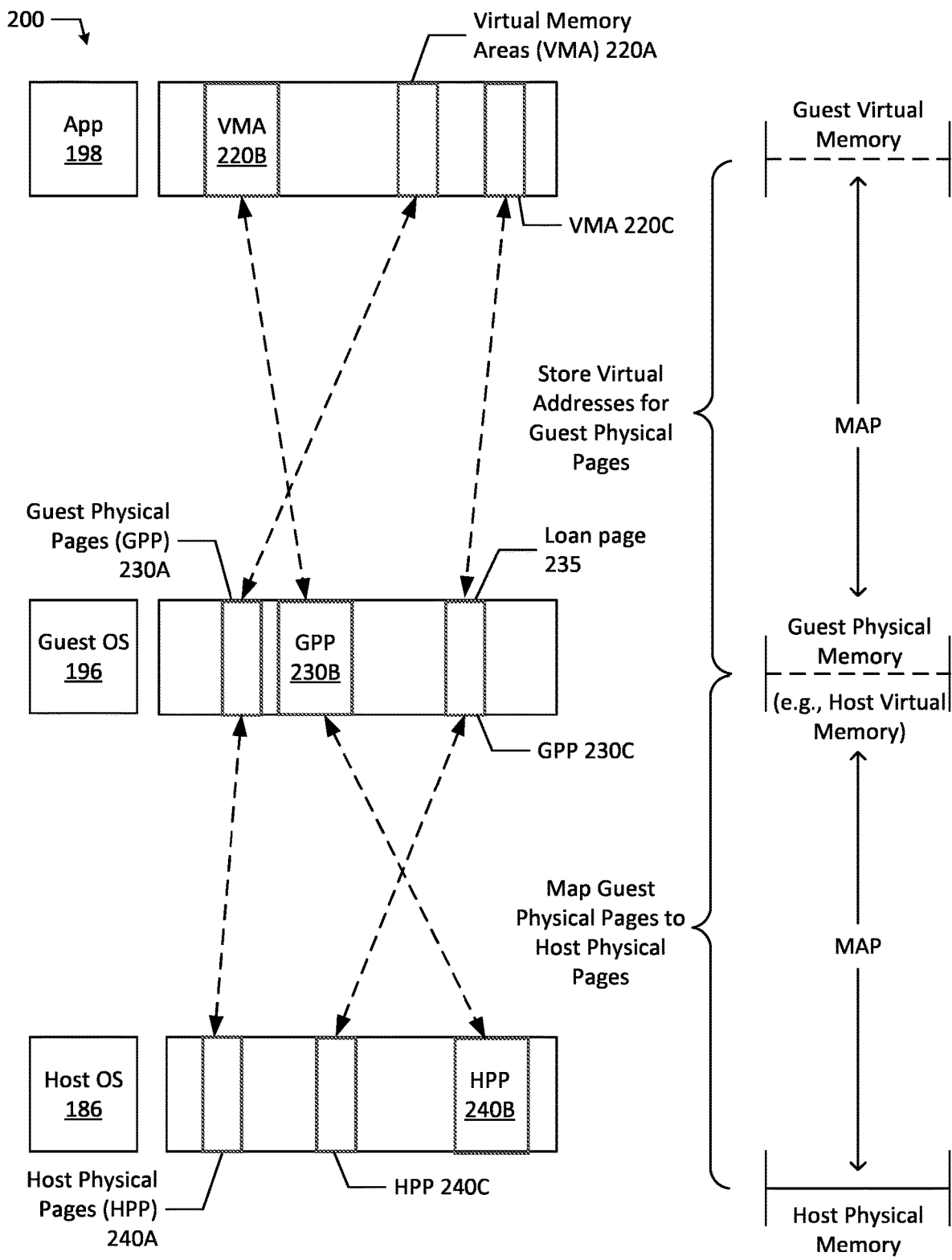
FIG. 2 illustrates a block diagram of memory mappings between a host, a guest and applications according to an example embodiment of the present disclosure.

FIG. 2 illustrates a block diagram of memory mappings between a host (e.g., host OS 186), a guest (e.g., guest OS 196) and applications (e.g., apps 198). For example, virtual memory areas ("VMAs") 220A-C, which are part of guest virtual memory used by applications 198, are mapped to guest physical pages ("GPPs") 230A-C. Some of the guest physical pages may be loan pages 235. For example, the guest physical memory may have a predetermined and fixed quantity of loan pages 235. The guest physical memory may be equivalent to host virtual memory, which is mapped to host physical memory. For example, the guest physical pages (e.g., GPPs 230A-C) may be mapped to host physical pages ("HPPs") 240A-C.

As illustrated in FIG. 2, the VMM 180 may store virtual address (e.g., virtual addresses associated with VMAs 220) for each GPP 230A-C and each GPP 230A-C may be mapped to a corresponding HPP 240A-C. For example, the applications and processes running on guest OS 196A-B are associated with a guest virtual address space. The guest OS 196A-B also have a guest physical address space, which is equivalent to the host (e.g., host OS 186) virtual address space. The host (e.g., host OS 186) is also associated with a host physical address space that includes physical memory (e.g., memory from memory devices MD130A-D). There is also a VMM address space or hypervisor address space that contains the guest physical memory and a hypervisor process address space associated with processes performed by the VMM 180 or hypervisor.

When mapping a file into the hypervisor process address space to be used as guest RAM in the guest physical address space, the VMM 180 or hypervisor may use "mmap( )" to map or place the file into the hypervisor process address space to be used as guest RAM starting at address "0" in the guest physical address space. This file may be located at address "A" with size "S" in the hypervisor process address space. Accessing the address "A" in the hypervisor process address space ultimately results in accessing a memory location in the host physical address space on a valid access.

The VMM 180, such as a hypervisor, defines memory regions or mappings to construct the guest physical address space from pieces of the hypervisor process address space. For example, the VMM 180 or hypervisor may map address "X" with size "S" in the hypervisor's process address space (may also be referred to as the hypervisor's virtual address space) to address "O" with size "S" in the guest physical address space. In an example, defined ranges in the guest physical address space correspond to "mmaped" ranges in the hypervisor process address space, which are either (1) backed by host physical pages in the host physical address space or (2) can become backed by host physical pages on access after resolving a page fault.

One of memory operations include swapping a page out (e.g., a page is swapped out), which may later be swapped in on access to a host physical page. Another example, includes a page that belongs to a file on disk that is loaded from disk on access to a host physical page. In another example, some pages may be compressed in RAM. In a system operating with the quick emulator (e.g., QEMU), the guest (e.g., guest OS 196) may communicate with the QEMU and request to inflate page "X" in the guest physical address space. Then, the QEMU may translate "X" into an address "Y" in the hypervisor process address space (e.g., the hypervisor virtual address space). Then, the QEMU may request the kernel to discard backing memory for the virtual address (e.g., address "Y") using a system call (e.g., madvise (Y, page_size, MADV_DONTNEED)). Then, the kernel may determine that host physical page "Z" is used for backing the QEMU virtual address "Y". Then, the kernel may discard the host physical page or free the host physical page to the page allocator. If the host physical page is currently swapped out, the kernel may free up swap space that is used for the swapped out page.

In an example, a loan page 235 is placed into the hypervisor process address space, which may also be referred to as the hypervisor virtual address space, which ultimately places the loan page 235 in the guest physical address space. For example, loan page 235 is illustrated in the guest physical address space in FIG. 2 along with other guest physical pages 230A and 230B. In the illustrated example, guest physical page 230C is a loan page 235. Placing the loan page 235 in the guest physical address space is achieved if the hypervisor defines the loan page 235 in such a way when constructing the guest physical address space. The loan page(s) 235 may behave like any other memory from the hypervisor process address space. In another example, the loan page(s) 235 may also be a host physical page (e.g., HPP 240A-C). Additionally, the loan page(s) 235 may be swapped out to become host physical pages (e.g., HPP 240A-C) when swapping in.

Loan page(s) 235 placed into the hypervisor process address space (and therefore in the guest physical address space) may be a "mmaped" file that is not yet valid to be accessed by the guest (e.g., guest OS 196). For example, when the guest OS 196 inflates memory, the guest OS 196 may agree to not use the inflated memory until deflating.

Without loan page(s) 235, access (e.g., read, write, execute, etc.) to inflated memory pages still works. For example, on access, a fresh page is taken from the portion of storage (e.g., backing storage) backing the inflated memory pages to resolve the page fault caused by the access. For example, HPPs 240A-C may serve as backing storage. The fresh page taken from the backing storage will remain and not get discarded, which causes silent, and often undetectable, overconsumption of memory. For example, many multiples of fresh pages may be taken from backing storage and remain in the system resulting in overconsumption of memory. The content of the fresh page remains unchanged when observed by the guest OS 196.

A fresh page may be a memory page filled with zeros. In another example, the fresh page may be a shared zero page that is read-only. Then, on write access, a new fresh page filled with zeros may be supplied. A zero page, which may also be referred to as a base page, may be a block of memory at the beginning of an address space. For example, the zero page may be a page whose starting address is "0". The size of the zero page may depend on system architecture and in some instances, the size may be equal to the largest value that can be referenced by the system's processor's indexing registers. For example, the aforementioned 8-bit processors have 8-bit index registers and a page size of 256 bytes. Therefore, their zero page extends from address 0 to address 255.

However, with loan page(s) 235, access (e.g., read, write, execute, etc.) to inflated memory pages still works, similar to the scenario described above without loan page(s) 235. However, the host (e.g., host OS 186) only allows a predetermined fixed quantity of loan page(s) 235 to be used. For example, the host (e.g., host OS 186) or the VMM 180 (e.g., hypervisor) keeps track of each of the loan page(s) 235 and will discard a loan page 235 when the maximum quantity of loan pages is reached. Once the maximum quantity of loan pages 235 is reached, one of the loan pages 235 is reclaimed (e.g., discarded, cleared and re-used to back another portion of memory). By doing so, the system includes a maximum of the predetermined fixed quantity of loan pages 235 that remain, which limits the amount of memory consumption (e.g., overconsumption) from accessing inflated memory pages. Furthermore, since the host (e.g., host OS 186) or the VMM 180 (e.g., hypervisor) keeps track of each of the loan page(s) 235, the loan pages 235 may be cleaned up at any time thereby advantageously eliminating any excess memory consumption caused by accessing inflated memory pages. By limiting the amount of backed inflated memory to the predetermined fixed quantity of loan pages 235, guests whether malicious, corrupted or while executing properly can only overconsume a predefined amount of memory. The predefined amount of memory is capped by the fixed quantity and size of the loan pages 235, which advantageously places a hard cap on the memory consumption of the guests. Conversely, without loan pages 235 temporarily backing inflated memory, the guests may silently continue to consume additional memory until the VM 170 crashes. Additionally, since the loan pages may be discarded at any time, attacks from malicious guests may be halted by the host (e.g., host OS 186) or the VMM 180 (e.g., hypervisor).

Figure 3:
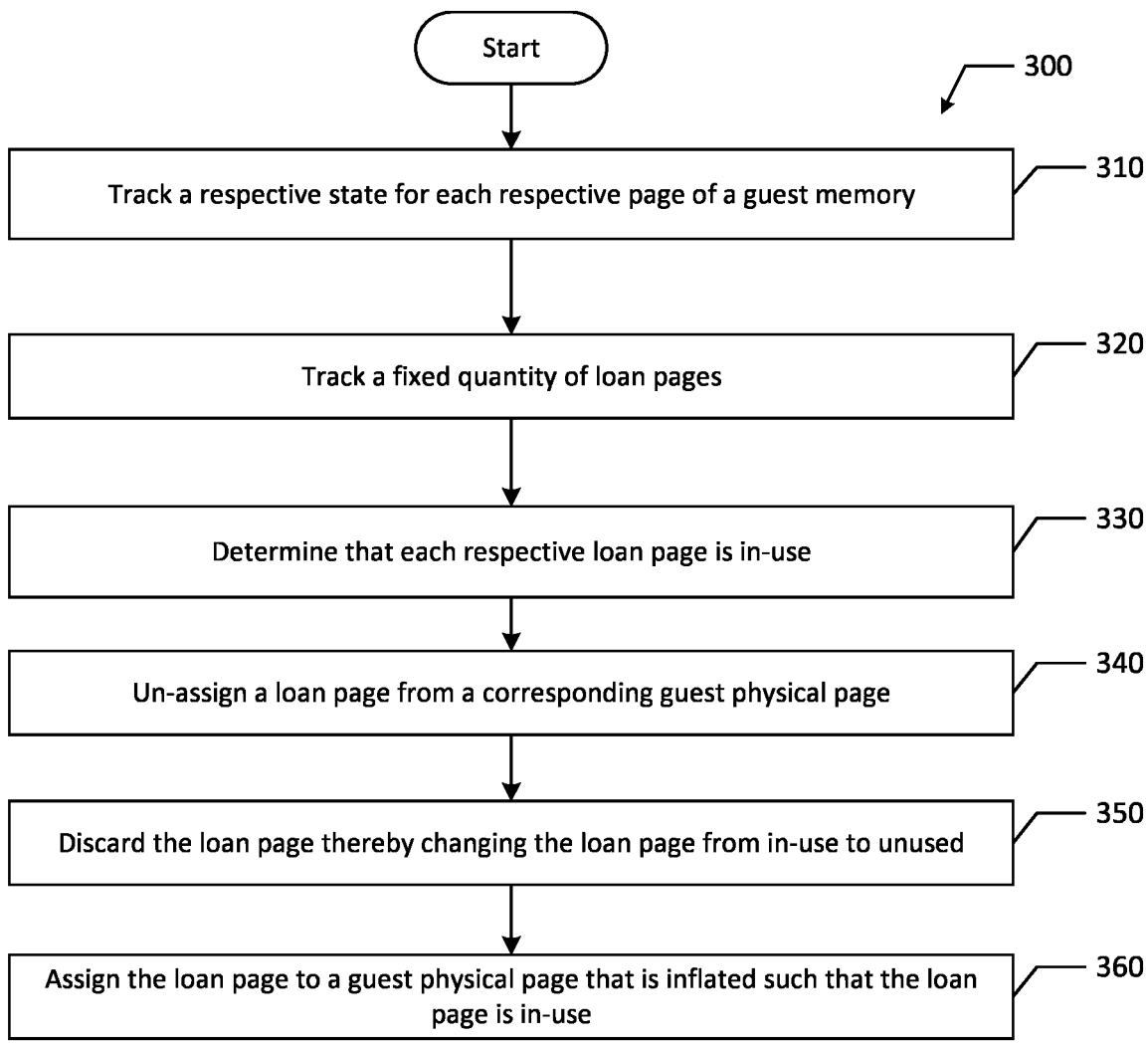
FIG. 3 illustrates a flowchart of an example process for protecting inflated memory with temporary loan pages according to an example embodiment of the present disclosure.

FIG. 3 illustrates a flowchart of an example method 300 for protecting inflated memory with temporary loan pages according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and some of the blocks described are optional. The method 300 may be performed by processing logic that may comprise hardware (circuitry, dedicated logic, etc.), software, or a combination of both.

The example method 300 includes tracking a respective state for each respective page of a guest memory (block 310). For example, a VMM 180 may track a respective state for each respective page of a plurality of guest physical pages (e.g., GPPs 230A-C) of the guest memory (e.g., guest memory 195). The respective state for each page may be either (i) inflated or (ii) deflated. Additionally, the guest physical pages (e.g., GPPs 230A-C) includes a plurality of loan pages 235 that has a fixed quantity. In an example, the loan pages 235 have a fixed quantity of two loan pages 235. The fixed quantity of loan pages 235 may typically be between a single loan page 235 to five loan pages 235. However, in some scenarios, there may be ten or more loan pages 235. Method 300 also includes tracking a fixed quantity of loan pages (block 320). For example, the VMM 180 may track a respective status of each of the plurality of loan pages 235. Each respective loan page 235 has a status of (i) in-use or (ii) unused. An in-use loan page 235 is a loan page 235 that is currently backing an inflated page. An unused loan page 235 is not currently backing an inflated page and is ready to be associated with an inflated page. Additionally, method 300 includes determining that each respective loan page is in-use (block 330). For example, the VMM 180 may determine that each respective loan page 235 of the plurality of loan pages 235 is in-use. In an example, the VMM 180 may determine a loan page 235 is in use by checking whether the loan page 235 is associated with a virtual address.

Then, method 300 includes un-assigning a loan page from a corresponding guest physical page (block 340). For example, responsive to determining that each respective loan page 235 has an in-use status, the VMM 188 may un-assign a first loan page 235 of the plurality of loan pages 235 from a corresponding guest physical page (e.g., GPP 230A) of the plurality of guest physical pages (e.g., GPPs 230A-C). The loan page 235 that is un-assigned may be the loan page 235 that has been assigned to a specific guest physical page (e.g., GPP 230A) for the longest period of time (e.g., the least recent assignment). Method 300 also includes discarding the loan page thereby changing the loan page from in-use to unused (block 350). For example, the VMM 180 may discard the first loan page 235 thereby changing the first loan page 235 from having an in-use status to having an unused status. Additionally, method 300 includes assigning the loan page to a guest physical page that is inflated, such that the loan page is in-use (block 360). For example, the VMM 180 may assign the first loan page 235 having the unused status to a first guest physical page (e.g., GPP 230C) that is inflated, such that the first loan page's status updates to in-use. Additionally, each respective page of the plurality of guest physical pages (e.g., GPPs 230A-C) having an inflated state are temporarily backed by the plurality of loan pages 235, which have a fixed quantity.

Even though inflated memory can still be read or written to, only a fixed number of physical pages (e.g., the loan pages 235) are required to back the inflated memory and the VMM 180 is advantageously aware of how much memory the guest consumes. Therefore, malicious guests may no longer silently reuse inflated pages. By having a fixed quantity of loan pages 235, the contents of the loan pages 235 will simply vanish at one point when the loan page 235 is recycled and reused. The systems and methods disclosed herein advantageously enable the VMM 180 or the host to guarantee how much memory a VM 170 is actually able to use in an environment that relies on memory devices, such as paravirtualized memory devices 199 for memory plugging and unplugging (e.g., hot(un)plug). Thus, the systems and methods disclosed herein allow for properly planning memory overcommit in a VMM 180 (e.g., a hypervisor) without surprises where a simple dump of a guest may result in a large memory consumption in the hypervisor or where a malicious guest can silently consume more memory than intended or planned for, which may cause the VM 170 or system to crash.

In an example, the guest may inflate a memory page by sending an inflation request to the VMM 180 (e.g., hypervisor). Then, the VMM 180 may receive the inflation request. Once received, the VMM 180 may grant or deny the inflation request. For example, the VMM 180 may receive an inflation request for a GPP (e.g., GPP 230A) and may grant the inflation request. Responsive to granting the inflation request, the VMM 180 may update the state for the GPP (e.g., GPP 230A) from deflated to inflated. Once the inflation request is granted, the guest may inflate the corresponding memory page associated with the request.

Figure 4:
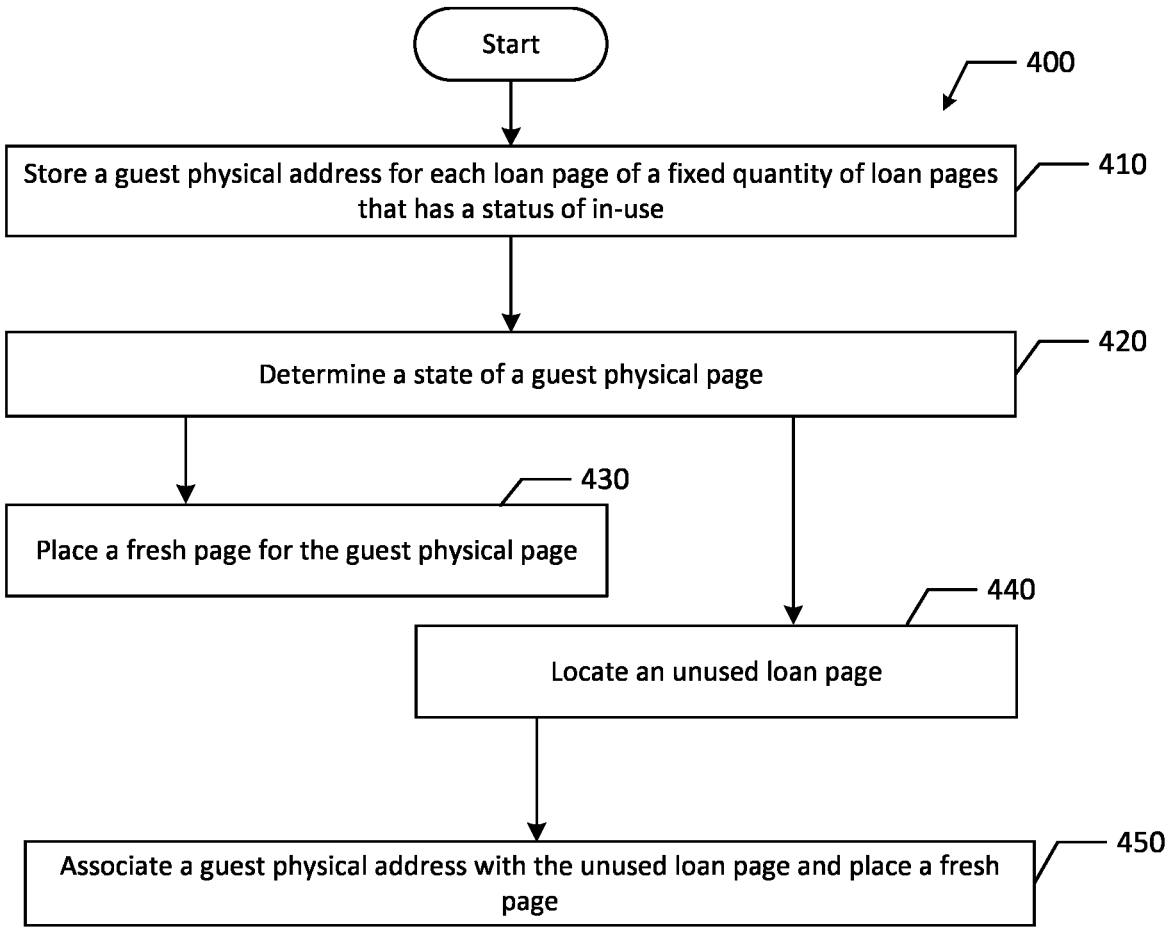
FIG. 4 illustrates a flowchart of an example process for protecting inflated memory with temporary loan pages according to an example embodiment of the present disclosure.

FIG. 4 illustrates a flowchart of an example method 400 for protecting inflated memory with temporary loan pages according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more blocks may be repeated, and some of the blocks described are optional. The method 400 may be performed by processing logic that may comprise hardware (circuitry, dedicated logic, etc.), software, or a combination of both.

The example method 400 includes storing a guest physical address for each loan page of a fixed quantity of loan pages that has a status of in-use (block 410). For example, a hypervisor may store a guest physical address for reach respective loan page 235 of at least one loan page 235 that has a status of in-use. Specifically, the method may utilized a predetermined fixed quantity of loan pages 235. The guest physical address may be mapped to a corresponding virtual address. Additionally, each respective loan page 235 has a status of either (i) in-use or (ii) unused. Then, method 400 includes determining a state of a guest physical page (block 420). For example, responsive to a page fault being reported for a first guest physical page (e.g., GPP 230A) of a plurality of guest physical pages (e.g., GPPs 230A-C), the hypervisor may determine a state of the first guest physical page (e.g., GPP 230A). In an example, the plurality of guest physical pages (e.g., GPPs 230A-C) includes the at least one loan page 235.

Method 400 may also include placing a fresh page for the guest physical page (block 430). For example, responsive to determining the state of the first guest physical page (e.g., GPP 230A) as deflated, the hypervisor may place a first fresh page for the first guest physical page (e.g., GPP 230A). A fresh page may be a memory page filled with zeros. In another example, the fresh page may be a shared zero page that is read-only, which is replaced with a new fresh page on write access. Placing a zero page may be requested by the QEMU to the kernel using an address that is valid in the hypervisor process address space (e.g., hypervisor virtual address space) to place the fresh page (e.g., zero page) into the hypervisor process address space thereby placing the fresh page in the gust physical address space.

In another example, method 400 may include locating an unused loan page (block 440). For example, responsive to determining the state of the first guest physical page (e.g., GPP 230A) as inflated, the hypervisor may locate an unused loan page 235 from the at least one loan page 235. In an example, the host physical page (e.g., HPP 240A-C) backing the guest physical page (e.g., GPP 230A-C) and the corresponding virtual address in the hypervisor process address space may have been discarded, resulting in the page fault. Once discarded, the next access of the corresponding virtual address results in a page fault on access. For example, the guest (e.g., guest OS 196) may access a guest physical page or a corresponding address associated with the guest physical page to dump its memory to that memory location. However, the mapping between the guest physical address and the host physical page may be missing such that there is nothing mapping the guest physical address to a host physical page. Similarly, on VMM 180 (e.g., hypervisor) access, for example when dumping guest memory to an address in the hypervisor process address space, the mapping between the hypervisor process address space and a host physical page may be missing. If an unused loan page 235 is unavailable, an in-use loan page may be freed up by discarding memory to convert an in-use loan page 235 to an unused loan page 235. Once the loan page 235 is freed up, it may be used by the hypervisor.

Then, method 400 includes associating a guest physical address with the unused loan page and placing a fresh page (block 450). For example, responsive to locating the unused loan page 235, the hypervisor may associate a respective guest physical address with the unused loan page 235 and place a second fresh page. As noted above, the fresh page may be a zeroed page. Each respective guest physical page (e.g., GPP 230A-C) having an inflated state is temporality backed by a respective loan page 235. By temporarily backing inflated pages with loan pages 235, the method 400 may advantageously prevent guests from silently reusing inflated pages because the content of the loan pages will simply vanish at one point. The use of the loan pages advantageously improves the ability to properly plan memory allocation by guaranteeing a predetermined amount of memory a VM 170 is able to use.

Figure 5A:
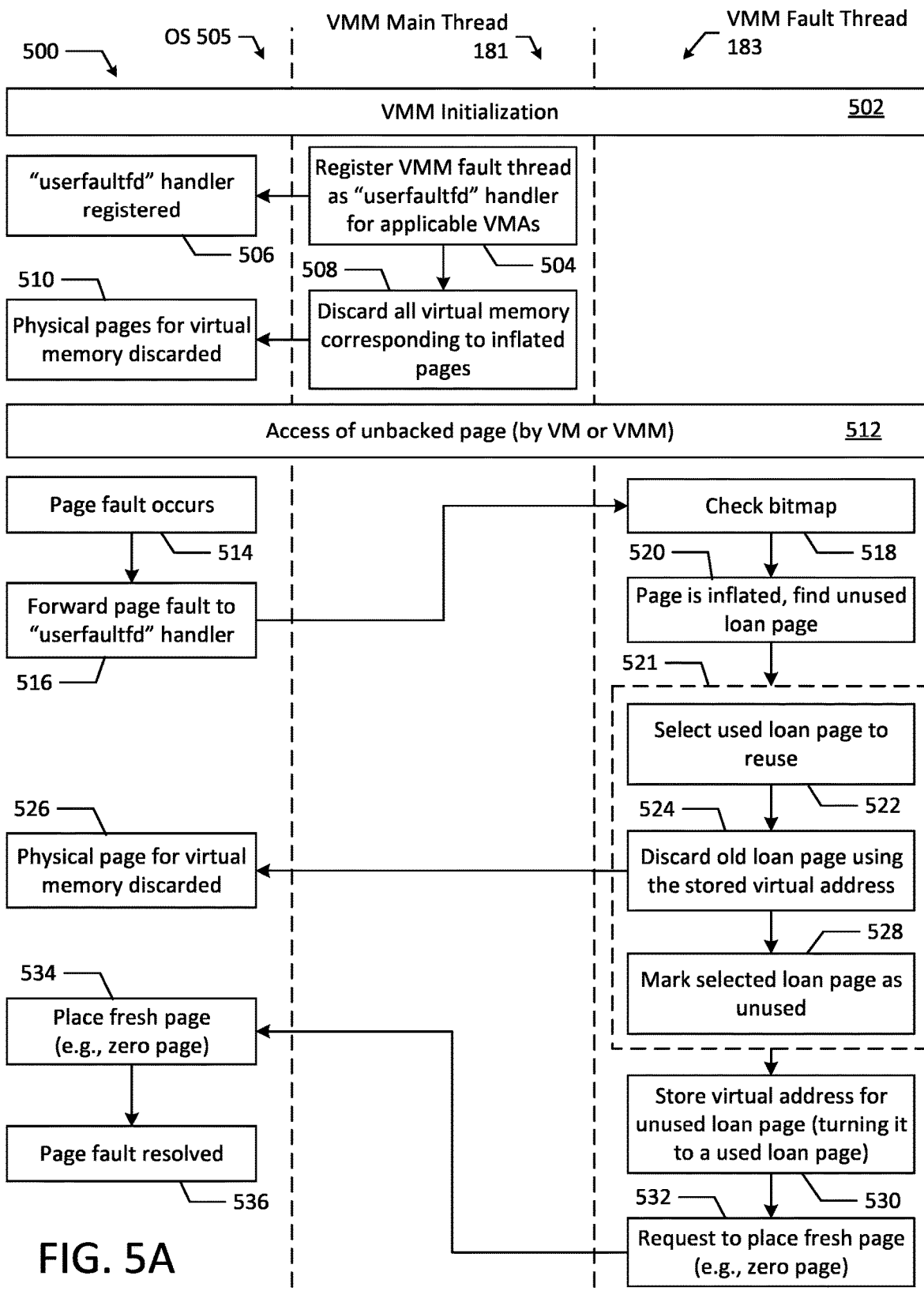
FIGS. 5A and 5B illustrate a flow diagram of an example process for protecting inflated memory with loan pages during various memory operations according to an example embodiment of the present disclosure.
Figure 5B:
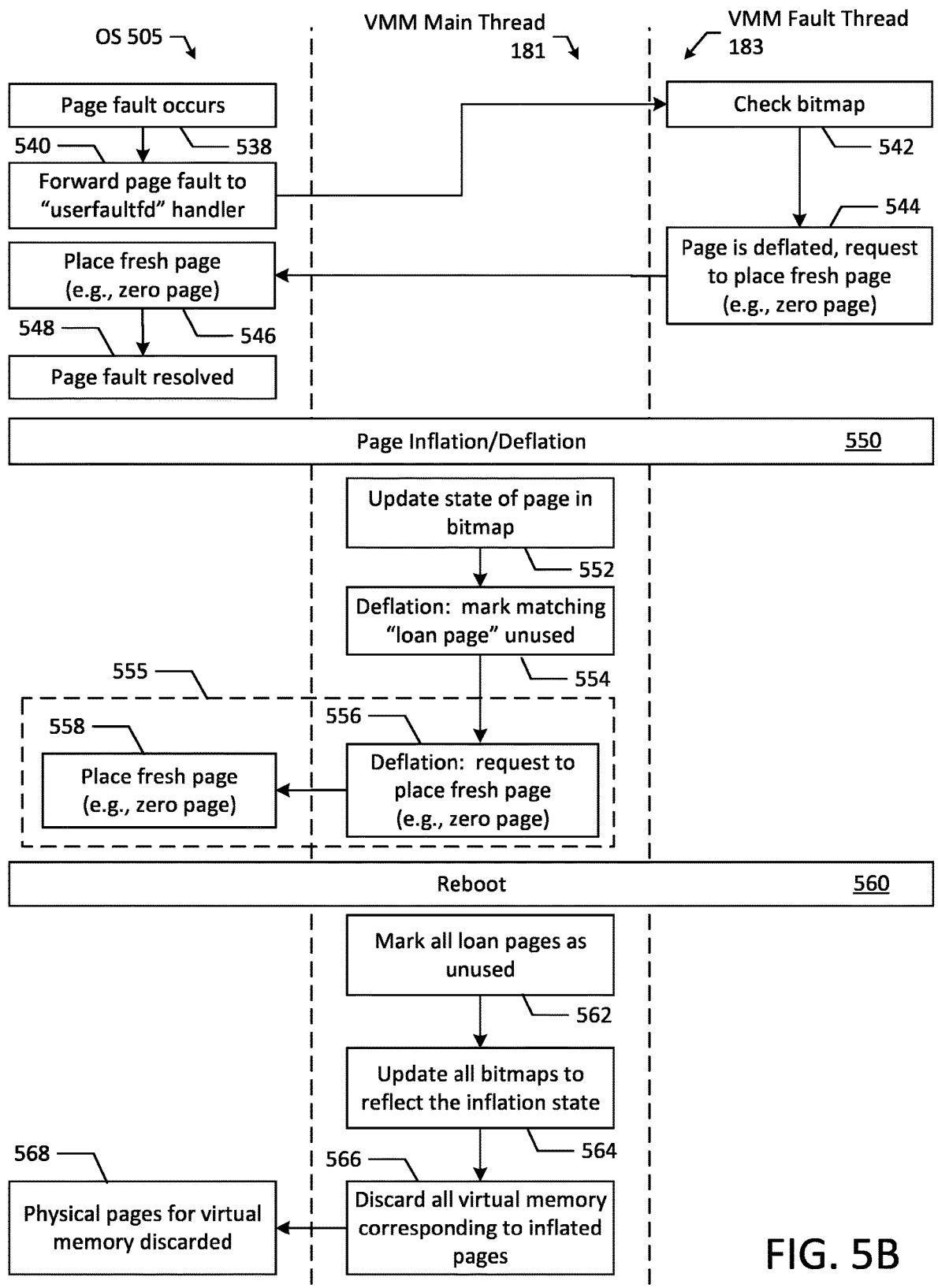

FIGS. 5A and 5B illustrate a flowchart of an example method 500 for protecting inflated memory with loan pages during various memory operations (e.g., inflate, deflate, access of unbacked memory pages, etc.) and system events (e.g., VMM initialization, reboot, etc.) in accordance with an example of the present disclosure. Although the example method 500 is described with reference to the flowchart illustrated in FIGS. 5A and 5B it will be appreciated that many other methods of performing the acts associated with the method 500 may be used. For example, the order of some of the blocks may be changed, certain blocks may be combined with other blocks, one or more blocks may be repeated, and some of the blocks described are optional. For example, an operating system (e.g., OS 505, such as host OS 186), a VMM main thread 181 and a VMM fault thread 183 communicate to perform example method 500 and to protect unplugged memory or inflated memory with loan pages.

In the illustrated example, during VMM initialization (block 502), the VMM main thread 181 registers the VMM fault thread 183 as "userfaultfd" handler for applicable VMAs (block 504). User faults allow on-demand paging from a user space (e.g., all processes and code that run outside of an operating system's kernel) and allow the user space to control various memory page faults, which is typically something the kernel specifically handles. The "userfaultfd" is a system call that allows user faults to be delivered to and resolved through the system call. Then, the "userfaultfd" handler is registered (block 506). Once registered, the "userfaultfd" handler may receive and resolve page faults. Specifically, the "userfaultfd" may be registered as the handler for all virtual memory areas ("VMAs") used as applicable guest memory. For traditional ballooning, the applicable guest memory may correspond to all virtual machine memory or guest memory 195A. In the case of paravirtualized memory devices 199, the applicable guest memory may correspond to device memory.

In the illustrated example, the VMM main thread 181 discards all virtual memory corresponding to inflated pages (block 508). For example, VMM 180 or the hypervisor, or more specifically the VMM main thread 181 may discard the virtual memory corresponding to inflated pages such that the inflated guest memory is guaranteed to be unbacked by physical pages. Once the memory is unbacked, access to the memory will trigger a page fault. Then, the physical pages for virtual memory are discarded (block 510). For example, the OS 505 may discard the physical pages associated with the virtual memory. More specifically, the VMM 180, such as a hypervisor, may discard the physical pages. In the case of traditional ballooning, nothing is inflated, so there may be nothing to discard. However, in the case of paravirtualized memory devices 199, all device memory may be initially inflated and therefore may be discarded.

While accessing an unbacked page, either by a VM 170 or by the VMM 180 (block 512) a page fault occurs (block 514). As mentioned above, access to an unbacked page results in a page fault, which may be resolved by the "userfaultfd" hander. Blocks 514 to 536 correspond to a scenario of accessing an unbacked, inflated guest physical page. The OS 505 forwards the page fault to the "userfaultfd" handler (block 516). OS 505 may refer to host OS 186 or VMM 180. Then, the VMM fault thread 183 checks a bitmap (e.g., a bitmap that stores states for guest physical pages, such as inflated and deflated) (block 518). The bitmap or bit array may include a plurality of bits where each memory page corresponds to a bit of information in the bitmap.

Then, the VMM fault thread 183 determines that the guest physical page is inflated and finds an unused loan page (block 520). For example, the bitmap may indicate that the guest physical page is inflated because the bitmap stores a state for each respective guest physical page of the applicable guest memory. The state of a guest physical page may be either inflated or deflated. In an example, other data structures such as one or more tables, linked lists, and so forth may also be used instead of or in addition to the bitmap. Each entry in the bitmap may be structured to include a data value that has a size of a bit, byte, or other length. In an example, the bitmap may indicate that a page is inflated by storing a value of "1" and may indicate that a page is deflated by storing a value of "0".

If there is an unused loan page available, the process described by block 521 is skipped. However, if an unused loan page 235 is unavailable, the VMM fault thread 183 selects a used loan page 235 to reuse (block 522). The loan page 235 selected for reuse may be the loan page 235 that has been in-use the longest. Then, the VMM fault thread 183 discards the old loan page 235 associated with the stored virtual address (block 524). Discarding the old loan page 235 may include un-associating the loan page with any corresponding mappings and virtual addresses and wiping the contents of the page. Discarding the old loan page 235 triggers the OS 505 to discard the physical page (e.g., host physical page or HPP 240) associated with the virtual memory (block 526). Then, after the loan page is discarded, the VMM fault thread 183 marks the selected loan page 235 as unused (block 528). Similar to the bitmap described above, a bitmap or similar data structure may indicate whether a loan page 235 is used or unused. In another example, the VMM 180 or more specifically the VMM fault thread 183 may determine whether a loan page 235 is in use based on whether there is a virtual address associated with the loan page 235

Now that there is an unused loan page 235, the VMM fault thread 183 stores a virtual address for the unused loan page, thereby turning the loan page into a used loan page (block 530). Additionally, the VMM fault thread requests to place a fresh page (e.g., a zero page) (block 532). A fresh page may be a memory page filled with zeros. In another example, the fresh page may be a shared zero page that is read-only. Then, the OS 505 places the fresh page (e.g., zero page) (block 534). Once the fresh page is placed, the page fault is resolved (block 536). For example, placing the fresh page may include populating a fresh physical page that is sealed with "zeroed" memory to be used to back the memory location and resolve the page fault.

Continuing on FIG. 5B, blocks 538 to 548 correspond to a scenario of accessing an unbacked, deflated guest physical page. For example, when accessing an unbacked, deflated physical page a page fault occurs (block 538). The OS 505 forwards the page fault to the "userfaultfd" handler (block 540). For example, the OS 505 may start to handle the page fault in a similar fashion as if the page was inflated. Then, the VMM fault thread 183 checks a bitmap (e.g., a bitmap that stores states for guest physical pages, such as inflated and deflated) (block 542). For example, the bitmap may indicate that the guest physical page is deflated because the bitmap stores a state for each respective guest physical page of the applicable guest memory. As mentioned above, the state of a guest physical page may be either inflated or deflated. After checking the bitmap, the VMM fault thread 183 determines that the guest physical page is deflated and requests to place a fresh page (e.g., zero page) (block 544). The request to place the fresh page provides backing to the memory location resulting in the page fault thereby resolving the page fault. Then, the OS 505 places the fresh page (e.g., zero page) (block 546). Once the fresh page is placed, the page fault is resolved (block 548). For example, the page fault occurs because the page was simply accessed for the first time and not yet backed by a physical page.

For page inflation/deflation (block 550), the VMM main thread 181 updates the state of the page (e.g., guest physical page) in the bitmap (block 552). For example, if a page changes from inflated to deflated, the bitmap is updated to indicate the change of state of the guest physical page. Similarly, if the page changes from deflated to inflated, the bitmap is similarly updated to indicate the change of state of the guest physical page such that the bitmap maintains and tracks the current status of each guest physical page. Updating the bitmap may include changing a bit value from "0" to "1" or vice-versa.

For deflation, the VMM main thread 181 marks the matching loan page 235 as unused (block 554). In an example, marking a loan page 235 as unused may include removing any addresses assigned to the loan page 235. In another example, replacing the address associated with the loan page with a "0" may indicate the loan page is unused. The processes outlined in block 555 are optional, but may be performed to improve performance. For example, after deflation, the VMM main thread 181 may request to place a fresh page (e.g., zero page) (block 556). The OS 505 may receive the request and place the fresh page (e.g., zero page) (block 558). By directly placing the fresh page, the system may avoid having to use the "userfaultfd" handler for the deflated page, which may conserve system resources.

In the case of deflation, a loan page 235 with a fitting virtual address may be marked as unused, otherwise the loan page 235 may be accidentally discarded later when the page is attempted to be re-used.

During reboot (block 560), the VMM main thread 181 marks all loan pages as unused (block 562). In an example, a portion of guest memory may be inflated after a reboot. Conversely, a portion of guest memory may be deflated after a reboot depending on system architecture. Additionally, the VMM main thread 181 updates all bitmaps to reflect the inflation state for each guest physical page (block 564). For example, the bitmap may be updated to reflect inflated memory. In the case of traditional ballooning, typically all virtual machine memory is initially deflated. In the case of paravirtualized memory devices 199, all device memory may be initially inflated. Then, the VMM main thread 181 discards all virtual memory corresponding to the inflated guest physical pages (block 566). For example, the VMM 180 or more specifically the VMM main thread 181 may discard virtual memory corresponding to inflated pages similar to VM initialization. After discarding the virtual memory, the physical pages corresponding to the virtual memory are discarded by the OS 505 (block 568). Discarding the physical pages guarantees that the virtual memory will be unbacked by physical pages. Once the memory is unbacked, access to the memory will trigger a page fault. Resolving the page faults triggers the process of backing inflated pages with loan pages 235. Since there is a predetermined and fixed quantity of loan pages 235, the system may advantageously control the amount of inflated memory (e.g., three loan pages 235 worth of memory) that may be accessed by malicious guests or the hypervisor.

Even though inflated memory can still be read or written to, only a fixed number of physical pages (e.g., the loan pages 235) are required to back the inflated memory. The system is advantageously aware of how much memory the guest consumes and malicious guests may no longer silently reuse inflated pages. By having a fixed quantity of loan pages 235, the contents of the loan pages 235 will simply vanish at one point when the loan page 235 is recycled and reused. Therefore, VMs 170 backed on huge pages will no longer consume large amounts of memory just because the VM 170 or VMM 180 is reading (e.g., creating a dump) guest memory, including inflated pages.

The predetermined, fixed quantity of loan pages 235 may be selected based on a quantity of memory operands expected to be performed by the system. For example, if the applications 198 or other system processes may perform up to three operands (e.g., memory accesses from different memory locations), then the quantity of loan pages may match the maximum quantity of memory operands performed by the system. Otherwise, if there are less loan pages 235 than memory operands, the system may cycle through a constant loop of discarding and reusing loan pages 235. For example, if a process requires accessing memory from three different memory pages, each of those pages (e.g., loan pages 235) need to retain their information for the memory operands to be successful, especially if the memory operands are dependent on each other. Therefore, at least three loan pages 235 may be required to ensure that a loan page 235 is backing a corresponding page that includes the required data to complete the memory operations. Otherwise, if there are only two loan pages for a system that typically performs three memory operands, before the memory operands can complete, the data backed by a first loan page is already discarded and reused once the system attempts to access the third page. Specifically, upon accessing the third memory location, the first memory location backed by the first loan page would be erased as the loan page is reused for the third memory location. In an example, the predetermined, fixed quantity of loan pages may be configurable to have a smaller or larger fixed quantity. Specifically, if a failure is detected from having too few loan pages 235, the system may add another loan page 235. However, typically the adjustment may be made by a system administrator.

Figure 6:
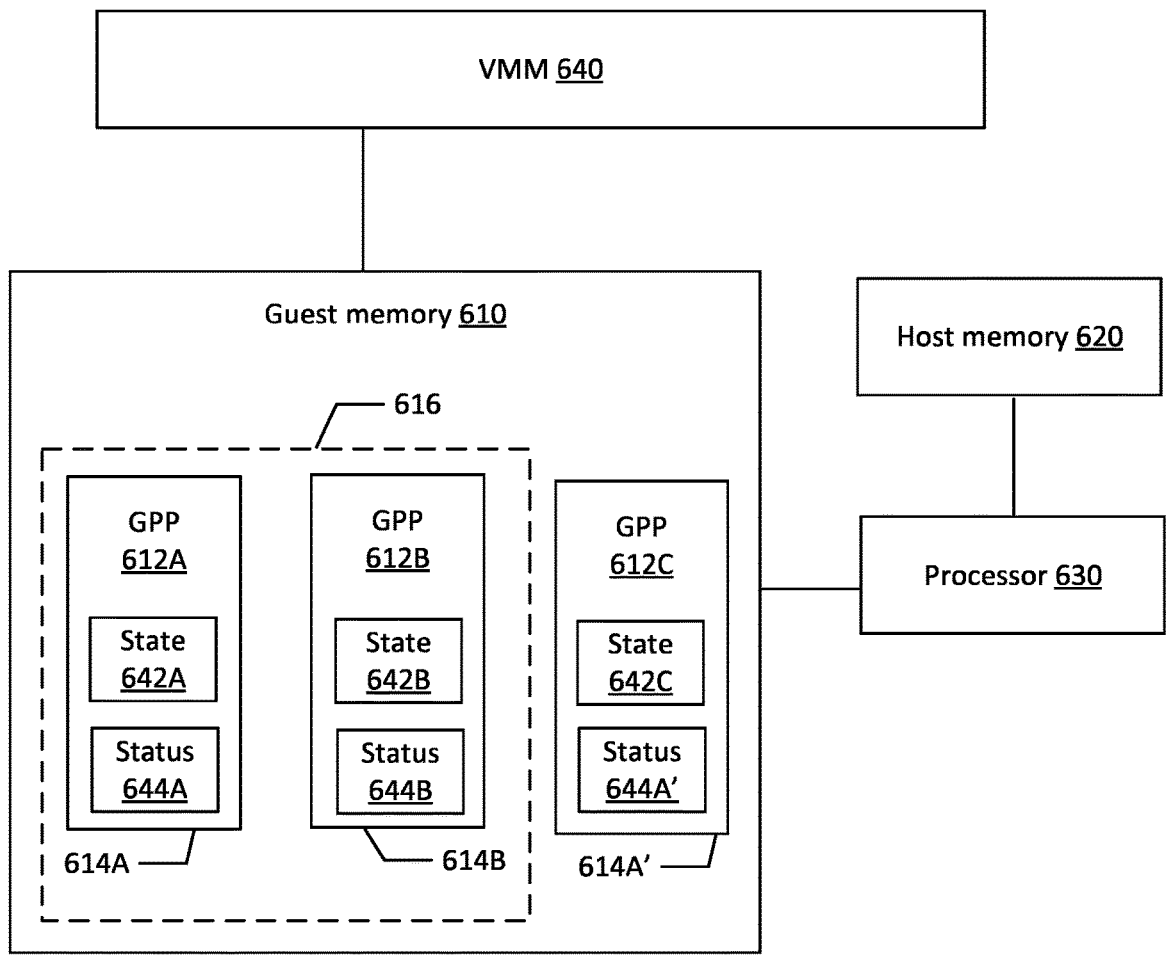
FIG. 6 illustrates a block diagram of an example memory protection system according to an example embodiment of the present disclosure.

FIG. 6 is a block diagram of an example inflated memory protection system 600 according to an example embodiment of the present disclosure. The system 600 includes a guest memory 610 having a plurality of GPPs 612A-C that includes a plurality of loan pages 614A-B. The plurality of loan pages 614A-B has a fixed quantity 616. The system 600 also includes a host memory 620, at least one processor 630 in communication with the guest memory 610 and the host memory 620, and a VMM 640. The VMM 640 is configured to track a respective state 642A-C for each respective page of the plurality of GPPs 612A-C of the guest memory 610. The respective state 642A-C is one of inflated and deflated. Additionally, the VMM 640 is configured to track a respective status 644A-B of each of the plurality of loan pages 614A-B. Each respective loan page 614A-B of the plurality of loan pages 614A-B has a status 644A-B of one of in-use and unused.

The VMM 640 is also configured to determine that each respective loan page 614A-B of the plurality of loan pages 614A-B is in-use. Responsive to determining that each respective loan page 614A-B has an in-use status 644A-B, the VMM 640 is configured to un-assign a first loan page 614A of the plurality of loan pages 614A-B from a corresponding GPP 612A of the plurality of GPPs 612A-C. Additionally, the VMM 640 is configured to discard the first loan page 614A thereby changing the first loan page 614A from in-use to unused, and assign the first loan page 614A' having the unused status 644A to a first GPP 612C that is inflated, such that the first loan page's status (e.g., status 644A' of loan page 614A') updates to in-use. In an example, each respective page of the plurality of GPPs 612A-C having an inflated state is temporarily backed by the plurality of loan pages 614A-B having the fixed quantity 616.

Figure 7:
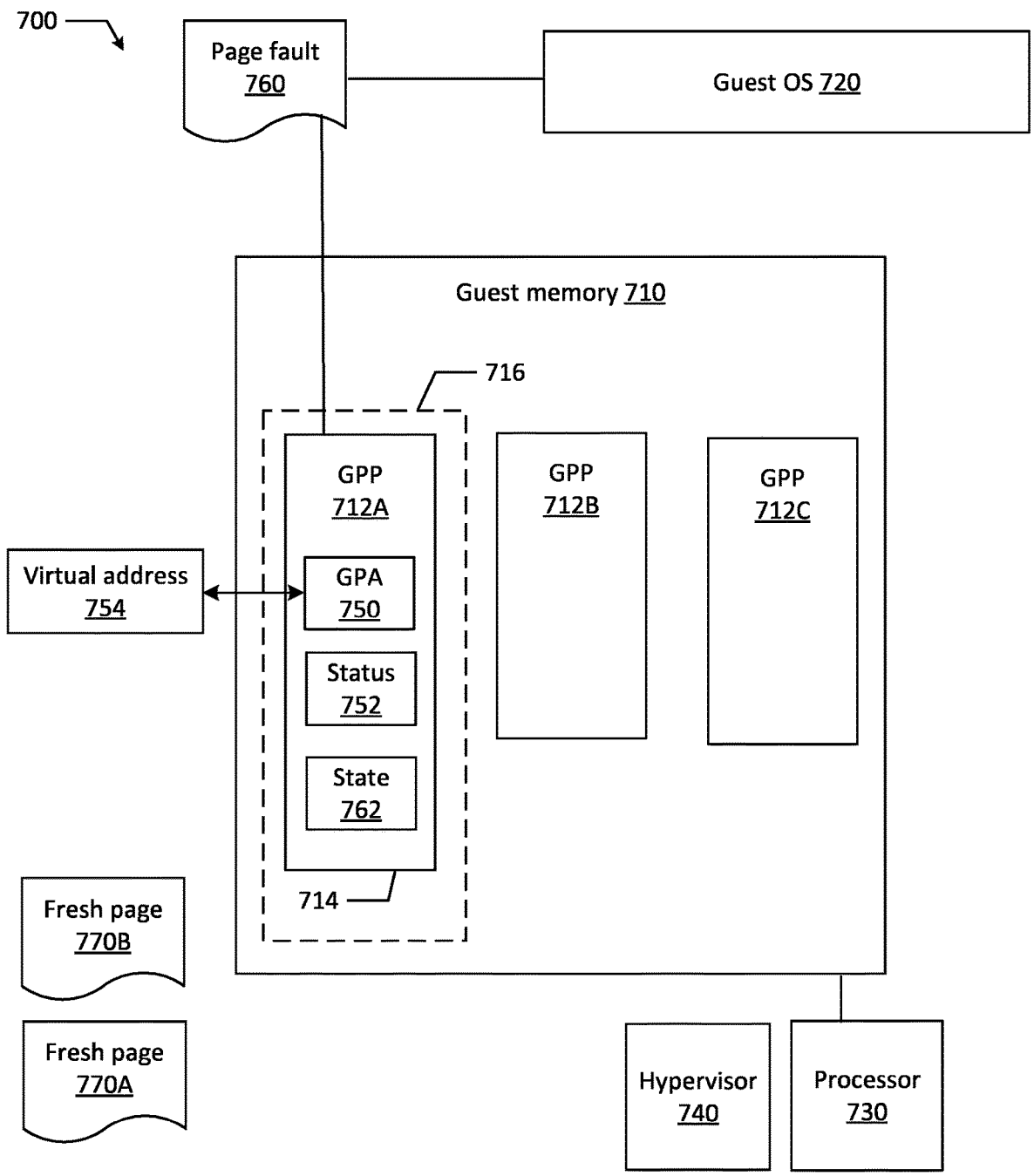
FIG. 7 illustrates a block diagram of an example memory protection system according to an example embodiment of the present disclosure.

FIG. 7 is a block diagram of an example inflated memory protection system 700 according to an example embodiment of the present disclosure. The system 700 includes a guest memory 710 having a plurality of GPPs 712A-C. The plurality of GPPs 712A-C includes at least one loan page 714, and the at least one loan page 714 has a fixed quantity 716. The system 700 also includes a guest operating system ("OS") 720, at least one processor 730 in communication with the guest memory 710, and a hypervisor 740. The hypervisor 740 is configured to store a guest physical address ("GPA") 750 for each respective loan page 714 having a status 752 of in-use. The GPA 750 is mapped to a corresponding virtual address 754, and each respective loan page 714 of the at least one loan page 714 has a respective status 752 of one of in-use and unused. Responsive to a page fault 760 being reported by the guest OS 720 for a first GPP 712A of the plurality of GPPs 712A-C, the hypervisor 740 is configured to determine a state 762 of the first GPP 712A. Responsive to determining the state 762 of the first GPP 712A as deflated, the hypervisor 740 is configured to place a first fresh page 770A for the first GPP 712A. Responsive to determining the state 762 of the first GPP 712A as inflated, the hypervisor 740 is configured to locate an unused loan page 714 from the at least one loan page 714. Additionally, responsive to locating the unused loan page 714, the hypervisor 720 is configured to associate a respective GPA 750 with the unused loan page 714 and place a second fresh page 770B. In an example, each respective GPP 712A having an inflated state 762 is temporarily backed by a respective loan page 714.

Instead of the systems 600 and 700 allowing guests to overconsume memory (e.g., by silently reusing inflated pages), the amount of memory overconsumption is restricted to a fixed quantity of loan pages (e.g., loan pages 614A-B of FIG. 6 and loan pages 714 of FIG. 7) which places a guaranteed limit on the amount of memory a virtual machine is able to use. By doing so, virtual machine may be implemented and memory allocations may be planned without the surprise surges in memory usage from malicious guests.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a guest memory having a plurality of guest physical pages ("GPPs") that includes a plurality of loan pages. The plurality of loan pages has a fixed quantity. The system also includes a host memory, at least one processor in communication with the guest memory and the host memory, and a virtual machine monitor ("VMM"). The VMM is configured to track a respective state for each respective page of the plurality of GPPs of the guest memory. The respective state is one of inflated and deflated. Additionally, the VMM is configured to track a respective status of each of the plurality of loan pages. Each respective loan page of the plurality of loan pages has a status of one of in-use and unused. The VMM is also configured to determine that each respective loan page of the plurality of loan pages is in-use. Responsive to determining that each respective loan page has an in-use status, the VMM is configured to un-assign a first loan page of the plurality of loan pages from a corresponding GPP of the plurality of GPPs. Additionally, the VMM is configured to discard the first loan page thereby changing the first loan page from in-use to unused, and assign the first loan page having the unused status to a first GPP that is inflated, such that the first loan page's status updates to in-use. Each respective page of the plurality of GPPs having an inflated state are temporarily backed by the plurality of loan pages having the fixed quantity.

In a 2nd exemplary aspect of the present disclosure, which may be used in combination with any one or more of the preceding aspects (e.g., the 1st aspect), the VMM is further configured to update a first state for the first GPP by updating a bitmap that includes each respective state for each respective GPP.

In a 3rd exemplary aspect of the present disclosure, which may be used in combination with any one or more of the preceding aspects (e.g., the 1st aspect), the VMM is further configured to receive an inflation request associated with the first GPP from a guest, grant the inflation request, and responsive to granting the inflation request, update a first state for the first GPP from deflated to inflated.

In a 4th exemplary aspect of the present disclosure, which may be used in combination with any one or more of the preceding aspects (e.g., the 1st aspect), the VMM is a hypervisor.

In a 5th exemplary aspect of the present disclosure, which may be used in combination with any one or more of the preceding aspects (e.g., the 1st aspect), the plurality of GPPs and the plurality of loan pages forms all of the guest memory.

In a 6th exemplary aspect of the present disclosure, which may be used in combination with any one or more of the preceding aspects (e.g., the 1st aspect), at least a portion of the guest memory is deflated after a reboot.

In a 7th exemplary aspect of the present disclosure, which may be used in combination with any one or more of the preceding aspects (e.g., the 1st aspect), the plurality of GPPs and the plurality of loan pages forms the guest memory, and the guest memory includes device memory.

In an 8th exemplary aspect of the present disclosure, which may be used in combination with any one or more of the preceding aspects (e.g., the 1st aspect), at least a portion of the guest memory is inflated after a reboot.

In a 9th exemplary aspect of the present disclosure, which may be used in combination with any one or more of the preceding aspects (e.g., the 1st aspect), the system further includes a VMM address space.

In a 10th exemplary aspect of the present disclosure, which may be used in combination with any one or more of the preceding aspects (e.g., the 9th aspect), the VMM is configured to map a file into the VMM address space.

In an 11th exemplary aspect of the present disclosure, which may be used in combination with any one or more of the preceding aspects (e.g., the 10th aspect), the file is configured to be used as one of the plurality of GPPs.

In a 12th exemplary aspect of the present disclosure, which may be used in combination with any one or more of the preceding aspects (e.g., the 11th aspect), the file is configured to be used as guest RAM, and the file starts at a first address in the guest memory. The file is located at a second address in the VMM address space and has an associated size.

In a 13th exemplary aspect of the present disclosure, which may be used in combination with any one or more of the preceding aspects (e.g., the 12th aspect), the VMM is configured to map the second address with the associated size in the VMM address space at the first address with the associated size in the guest memory.

In a 14th exemplary aspect of the present disclosure, which may be used in combination with any one or more of the preceding aspects (e.g., the 9th aspect), the VMM is configured to place a loan page in the VMM address space.

In a 15th exemplary aspect of the present disclosure, which may be used in combination with any one or more of the preceding aspects (e.g., the 1st aspect), the plurality of loan pages is associated with a second quantity of memory operands. The fixed quantity and the second quantity are the same.

In a 16th exemplary aspect of the present disclosure, which may be used in combination with any one or more of the preceding aspects (e.g., the 15th aspect), the fixed quantity is three.

In a 17th exemplary aspect of the present disclosure, which may be used in combination with any one or more of the preceding aspects (e.g., the 1st aspect), the fixed quantity is configurable to have a larger fixed quantity.

Aspects of the subject matter described herein may be useful alone or in combination with one or more other aspects described herein. In an 18th exemplary aspect of the present disclosure a method includes tracking, by a virtual machine monitor ("VMM"), a respective state for each respective page of a plurality of guest physical pages ("GPPs") of a guest memory. The respective state is one of inflated and deflated, and the plurality of GPPs includes a plurality of loan pages that has a fixed quantity. Additionally, the method includes tracking, by the VMM, a respective status of each of the plurality of loan pages. Each respective loan page of the plurality of loan pages has a status of one of in-use and unused. The method also includes determining, by the VMM, that each respective loan page of the plurality of loan pages is in-use. Responsive to determining that each respective loan page has an in-use status, the method includes un-assigning, by the VMM, a first loan page of the plurality of loan pages from a corresponding GPP of the plurality of GPPs. Additionally, the method includes discarding, by the VMM, the first loan page thereby changing the first loan page from having an in-use status to having an unused status. The method also includes assigning, by the VMM, the first loan page having the unused status to a first GPP that is inflated, such that the first loan page's status updates to in-use. Each respective page of the plurality of GPPs having an inflated state are temporarily backed by the plurality of loan pages having the fixed quantity.

In a 19th exemplary aspect of the present disclosure, which may be used in combination with any one or more of the preceding aspects (e.g., the 18th aspect), the method further includes updating, by the VMM, a first state for the first GPP by updating a bitmap that includes each respective state for each respective GPP.

In a 20th exemplary aspect of the present disclosure, which may be used in combination with any one or more of the preceding aspects (e.g., the 18th aspect), the method further includes receiving, by the VMM, an inflation request associated with the first GPP from a guest. Additionally, the method includes granting, by the VMM, the inflation request. Responsive to granting the inflation request, the method also includes updating, by the VMM, a first state for the first GPP from deflated to inflated.

In a 21st exemplary aspect of the present disclosure, which may be used in combination with any one or more of the preceding aspects (e.g., the 18th aspect), the VMM is a hypervisor.

In a 22nd exemplary aspect of the present disclosure, which may be used in combination with any one or more of the preceding aspects (e.g., the 18th aspect), the plurality of GPPs and the plurality of loan pages corresponds to all of the guest memory.

In a 23rd exemplary aspect of the present disclosure, which may be used in combination with any one or more of the preceding aspects (e.g., the 18th aspect), at least a portion of the guest memory is deflated after a reboot.

In a 24th exemplary aspect of the present disclosure, which may be used in combination with any one or more of the preceding aspects (e.g., the 18th aspect), the plurality of GPPs and the plurality of the loan pages forms the guest memory, and the guest memory includes device memory.

In a 25th exemplary aspect of the present disclosure, which may be used in combination with any one or more of the preceding aspects (e.g., the 18th aspect), at least a portion of the guest memory is inflated after a reboot.

In a 26th exemplary aspect of the present disclosure, which may be used in combination with any one or more of the preceding aspects (e.g., the 18th aspect), the method further includes mapping, by the VMM, a file into a VMM address space.

In a 27th exemplary aspect of the present disclosure, which may be used in combination with any one or more of the preceding aspects (e.g., the 26th aspect), the file is configured to be used as one of the plurality of GPPs.

In a 28th exemplary aspect of the present disclosure, which may be used in combination with any one or more of the preceding aspects (e.g., the 27th aspect), the file is configured to be used as guest RAM, wherein the file starts at a first address in the guest memory, and the file is located at a second address in the VMM address space and has an associated size.

In a 29th exemplary aspect of the present disclosure, which may be used in combination with any one or more of the preceding aspects (e.g., the 28th aspect), the method further includes mapping, by the VMM, the second address with the associated size in the VMM address space at the first address with the associated size in the guest memory.

In a 30th exemplary aspect of the present disclosure, which may be used in combination with any one or more of the preceding aspects (e.g., the 18th aspect), the method further includes placing, by the VMM a loan page in a VMM address space.

Aspects of the subject matter described herein may be useful alone or in combination with one or more other aspects described herein. In a 31st exemplary aspect of the present disclosure a system includes a first means for tracking a respective state for each respective page of a plurality of guest physical pages ("GPPs") of a guest memory. The respective state is one of inflated and deflated, and the plurality of GPPs includes a plurality of loan pages. The plurality of loan pages has a fixed quantity. The system also includes a second means for tracking a respective status of each of the plurality of loan pages. Each respective loan page of the plurality of loan pages has a status of one of in-use and unused. Additionally, the system includes a means for determining that each respective loan page of the plurality of loan pages is in-use, a means for un-assigning a first loan page of the plurality of loan pages from a corresponding GPP of the plurality of GPPs responsive to determining that each respective loan page has an in-use status, and a means for discarding the first loan page thereby changing the first loan page from having an in-use status to having an unused status. The system also includes a means for assigning the first loan page having the unused status to a first GPP that is inflated, such that the first loan page's status updates to in-use, wherein each respective page of the plurality of GPPs having an inflated state are temporarily backed by the plurality of loan pages having the fixed quantity.

Aspects of the subject matter described herein may be useful alone or in combination with one or more other aspects described herein. In a 32nd exemplary aspect of the present disclosure a non-transitory machine-readable medium stores code, which when executed by a processor is configured to track a respective state for each respective page of a plurality of GPPs of a guest memory. The respective state is one of inflated and deflated, and the plurality of GPPs includes a plurality of loan pages, wherein the plurality of loan pages has a fixed quantity. The non-transitory machine-readable medium is also configured to track a respective status of each of the plurality of loan pages. Each respective loan page of the plurality of loan pages has a status of one of in-use and unused. Additionally, the non-transitory machine-readable medium is configured to determine that each respective loan page of the plurality of loan pages is in-use, and responsive to determining that each respective loan page has an in-use status, un-assign a first loan page of the plurality of loan pages from a corresponding GPP of the plurality of GPPs. The non-transitory machine-readable medium is also configured to discard the first loan page thereby changing the first loan page from having an in-use status to having an unused status. Additionally, the non-transitory machine-readable medium is configure to assign the first loan page having the unused status to a first GPP that is inflated, such that the first loan page's status updates to in-use. Each respective page of the plurality of GPPs having an inflated state are temporarily backed by the plurality of loan pages having the fixed quantity.

Aspects of the subject matter described herein may be useful alone or in combination with one or more other aspects described herein. In a 33rd exemplary aspect of the present disclosure a system includes a guest memory having a plurality of guest physical pages ("GPPs"). The plurality of GPPs includes at least one loan page, and the at least one loan page has a fixed quantity. The system also includes a guest operating system ("OS"), at least one processor in communication with the guest memory, and a hypervisor. The hypervisor is configured to store a guest physical address ("GPA") for each respective loan page having a status of in-use. The GPA is mapped to a corresponding virtual address, and each respective loan page of the at least one loan page has a status of one of in-use and unused. Responsive to a page fault being reported by the guest OS for a first GPP of the plurality of GPPs, the hypervisor is configured to determine a state of the first GPP. Responsive to determining the state of the first GPP as deflated, the hypervisor is configured to place a first fresh page for the first GPP. Responsive to determining the state of the first GPP as inflated, the hypervisor is configured to locate an unused loan page from the at least one loan page. Additionally, responsive to locating the unused loan page, the hypervisor is configured to associate a respective GPA with the unused loan page and place a second fresh page. Each respective GPP having an inflated state is temporarily backed by a respective loan page.

In a 34th exemplary aspect of the present disclosure, which may be used in combination with any one or more of the preceding aspects (e.g., the 33rd aspect), the hypervisor is configured to register a fault thread as a fault handler for the guest memory.

In a 35th exemplary aspect of the present disclosure, which may be used in combination with any one or more of the preceding aspects (e.g., the 33rd aspect), the hypervisor is configured to discard a first loan page of the at least one loan page responsive to each loan page being in-use, thereby transitioning the first loan page from in-use to unused.

In a 36th exemplary aspect of the present disclosure, which may be used in combination with any one or more of the preceding aspects (e.g., the 35th aspect), the first loan page is the least recent loan page to be associated with a respective GPA.

In a 37th exemplary aspect of the present disclosure, which may be used in combination with any one or more of the preceding aspects (e.g., the 33rd aspect), the plurality of GPPs and the at least one loan page corresponds to all of the guest memory.

In a 38th exemplary aspect of the present disclosure, which may be used in combination with any one or more of the preceding aspects (e.g., the 33rd aspect), the system further includes at least one para-virtualized memory device. The guest memory corresponds to device memory.

In a 39th exemplary aspect of the present disclosure, which may be used in combination with any one or more of the preceding aspects (e.g., the 33rd aspect), the guest OS configured to inflate a respective GPP of the plurality of GPPs, and deflate a respective GPP of the plurality of GPPs.

In a 40th exemplary aspect of the present disclosure, which may be used in combination with any one or more of the preceding aspects (e.g., the 39th aspect), inflating the respective GPP include sending an inflation request to the hypervisor.

In a 41st exemplary aspect of the present disclosure, which may be used in combination with any one or more of the preceding aspects (e.g., the 39th aspect), the hypervisor is configured to discard memory corresponding to the inflated GPP, such that a future access of a memory location associated with the inflated GPP results in a page fault.

In a 42nd exemplary aspect of the present disclosure, which may be used in combination with any one or more of the preceding aspects (e.g., the 39th aspect), the hypervisor is configured to update a bitmap each for each instance the guest inflates or deflates a respective GPP to indicate an updated state for the respective GPP in the bitmap.

Aspects of the subject matter described herein may be useful alone or in combination with one or more other aspects described herein. In a 43rd exemplary aspect of the present disclosure a method includes storing, by a hypervisor, a guest physical address ("GPA") for each respective loan page of at least one loan page that has a status of in-use. The GPA is mapped to a corresponding virtual address, and each respective loan page has a status of one of in-use and unused. Responsive to a page fault being reported for a first guest physical page ("GPP") of a plurality of GPPs, the method includes determining, by the hypervisor, a state of the first GPP. The plurality of GPPs includes at least one loan page. Responsive to determining the state of the first GPP as deflated, the method includes placing, by the hypervisor, a first fresh page for the first GPP. Responsive to determining the state of the first GPP as inflated, the method includes discarding, by the hypervisor, a corresponding page backing the GPP and locating an unused loan page from the at least one loan page. Additionally, responsive to locating the unused loan page, the method includes associating, by the hypervisor, a respective GPA with the unused loan page and placing a second fresh page. Each respective GPP having an inflated state is temporarily backed by a respective loan page.

In a 44th exemplary aspect of the present disclosure, which may be used in combination with any one or more of the preceding aspects (e.g., the 43rd aspect), the method further includes registering, by the hypervisor, a fault thread as a fault handler for the guest memory.

In a 45th exemplary aspect of the present disclosure, which may be used in combination with any one or more of the preceding aspects (e.g., the 43rd aspect), the method further includes determining, by the hypervisor, that each loan page is in-use. Additionally, responsive to determining each loan page being in-use, the method includes discarding, by the hypervisor, a first loan page of the at least one loan page, thereby transitioning the first loan page from in-use to unused.

In a 46th exemplary aspect of the present disclosure, which may be used in combination with any one or more of the preceding aspects (e.g., the 43rd aspect), the plurality of GPPs and the at least one loan page corresponds to all guest memory.

In a 47th exemplary aspect of the present disclosure, which may be used in combination with any one or more of the preceding aspects (e.g., the 43rd aspect), the method further includes inflating, by the guest OS, a respective GPP of the plurality of GPPs. Additionally, the method includes deflating, by the guest OS, a respective GPP of the plurality of GPPs.

In a 48th exemplary aspect of the present disclosure, which may be used in combination with any one or more of the preceding aspects (e.g., the 47th aspect), inflating the respective GPP includes sending, by the guest OS, an inflation request to the hypervisor.

In a 49th exemplary aspect of the present disclosure, which may be used in combination with any one or more of the preceding aspects (e.g., the 47th aspect), the method further includes discarding, by the hypervisor, memory corresponding to the inflated GPP, such that a future access of a memory location associated with the inflated GPP results in a page fault.

In a 50th exemplary aspect of the present disclosure, which may be used in combination with any one or more of the preceding aspects (e.g., the 47th aspect), the method further includes updating, by the hypervisor, a bitmap each for each instance the guest inflates or deflates a respective GPP to indicate an updated state for the respective GPP in the bitmap.

Aspects of the subject matter described herein may be useful alone or in combination with one or more other aspects described herein. In a 51st exemplary aspect of the present disclosure a system includes a means for storing a guest physical address ("GPA") for each respective loan page of at least one loan page that has a status of in-use. The GPA is mapped to a corresponding virtual address, and each respective loan page has a status of one of in-use and unused. The system also includes a means for determining a state of the first guest physical page ("GPP") responsive to a page fault being reported for a first GPP of a plurality of GPPs. The plurality of GPPs includes at least one loan page.

Additionally, the system includes a means for placing a first fresh page for the first GPP responsive to determining the state of the first GPP as deflated, a means for discarding a corresponding page backing the GPP and a means for locating an unused loan page from the at least one loan page responsive to determining the state of the first GPP as inflated. The system also includes a means for associating a respective GPA with the unused loan page and a means for placing a second fresh page responsive to locating the unused loan page. Each respective GPP having an inflated state is temporarily backed by a respective loan page.

Aspects of the subject matter described herein may be useful alone or in combination with one or more other aspects described herein. In a 52nd exemplary aspect of the present disclosure a non-transitory machine-readable medium stores code, which when executed by a processor is configured to store a GPA for each respective loan page of at least one loan page that has a status of in-use. The GPA is mapped to a corresponding virtual address, and each respective loan page has a status of one of in-use and unused. Responsive to a page fault being reported for a first GPP of a plurality of GPPs, the non-transitory machine-readable medium is configured to determine a state of the first GPP. The plurality of GPPs includes at least one loan page. Responsive to determining the state of the first GPP as deflated, the non-transitory machine-readable medium is configured to place a first fresh page for the first GPP. Responsive to determining the state of the first GPP as inflated, the non-transitory machine-readable medium is configured to locate an unused loan page from the at least one loan page. Additionally, responsive to locating the unused loan page, the non-transitory machine-readable medium is configured to associate a respective GPA with the unused loan page and place a second fresh page. Each respective GPP having an inflated state is temporarily backed by a respective loan page.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   tracking a respective state for each respective page of a plurality of guest physical pages ("GPPs") of a guest memory, wherein the plurality of GPPs includes a first group of pages, the respective state is one of inflated and deflated, and wherein the plurality of GPPs includes a second group of pages comprising a plurality of loan pages that has a fixed quantity;
   tracking a respective status of each of the plurality of loan pages of the second group, wherein each respective loan page of the plurality of loan pages of the second group has a status of one of in-use and unused;
   determining that each respective loan page of the plurality of loan pages of the second group is in-use;

responsive to determining that each respective loan page has an in-use status, un-assigning a first loan page of the plurality of loan pages of the second group from a corresponding GPP of the plurality of GPPs of the first group;

discarding the first loan page thereby changing the first loan page from having an in-use status to having an unused status; and assigning the first loan page having the unused status to a first GPP of the first group that is inflated, such that the first loan page's status updates to in-use, wherein each respective page of the plurality of GPPs of the first group having an inflated state are temporarily backed by the plurality of loan pages of the second group having the fixed quantity.

2. The method of claim 1, further comprising updating a first state for the first GPP by updating a bitmap that includes each respective state for each respective GPP.

3. The method of claim 1, further comprising:
receiving an inflation request associated with the first GPP from a guest;
granting the inflation request; and
responsive to granting the inflation request, updating a first state for the first GPP from deflated to inflated.

4. The method of claim 1, further comprising mapping a file into a VMM address space, wherein the file is configured to be used as at least one of (i) one of the plurality of GPPs and (ii) as guest RAM, wherein the file starts at a first address in the guest memory, and wherein the file is located at a second address in the VMM address space and has an associated size.

5. The method of claim 4, further comprising:
mapping the second address with the associated size in the VMM address space at the first address with the associated size in the guest memory.

6. The method of claim 1, further comprising placing a loan page in a VMM address space.

7. A system comprising:
a guest memory having a plurality of GPPs, wherein the plurality of GPPs includes a first group of pages and a second group of pages that includes a plurality of loan pages, wherein the plurality of loan pages has a fixed quantity;
a host memory;
at least one processor in communication with the guest memory and the host memory; and
a VMM configured to:
track a respective state for each respective page of the plurality of GPPs of the first group of the guest memory, wherein the respective state is one of inflated and deflated,
track a respective status of each of the plurality of loan pages of the second group, wherein each respective loan page of the plurality of loan pages of the second group has a status of one of in-use and unused,
determine that each respective loan page of the plurality of loan pages of the second group is in-use,
responsive to determining that each respective loan page has an in-use status, un-assign a first loan page of the plurality of loan pages of the second group from a corresponding GPP of the plurality of GPPs of the first group,
discard the first loan page thereby changing the first loan page from in-use to unused, and
assign the first loan page having the unused status to a first GPP of the first group that is inflated, such that the first loan page's status updates to in-use, wherein each respective page of the plurality of GPPs of the first group having an inflated state are temporarily backed by the plurality of loan pages of the second group having the fixed quantity.

8. The system of claim 7, wherein the VMM is further configured to update a first state for the first GPP by updating a bitmap that includes each respective state for each respective GPP.

9. The system of claim 7, wherein the VMM is a hypervisor.

10. The system of claim 7, wherein at least a portion of the guest memory is at least one of (i) deflated after a reboot and (ii) inflated after the reboot.

11. The system of claim 7, wherein the plurality of GPPs and the plurality of loan pages forms the guest memory, and wherein the guest memory includes device memory.

12. The system of claim 7, wherein the plurality of loan pages is associated with a second quantity of memory operands, and wherein the fixed quantity and the second quantity are the same.

13. The system of claim 12, wherein the fixed quantity is an initial fixed quantity that is configurable to have a larger fixed quantity than the initial fixed quantity.

14. A system comprising:
a guest memory having a plurality of GPPs, wherein the plurality of GPPs includes a first group of pages and a second group of pages that comprises at least one loan page, and wherein the at least one loan page has a fixed quantity;
a guest operating system ("OS");
at least one processor in communication with the guest memory; and
a hypervisor configured to:
store a guest physical address ("GPA") for each respective loan page of the second group having a status of in-use, wherein the GPA is mapped to a corresponding virtual address, wherein each respective loan page of the at least one loan page of the second group has a status of one of in-use and unused,
responsive to a page fault being reported by the guest OS for a first GPP of the first group of the plurality of GPPs, determine a state of the first GPP,
responsive to determining the state of the first GPP as deflated, place a first fresh page for the first GPP,
responsive to determining the state of the first GPP as inflated, locate an unused loan page from the at least one loan page of the second group, and
responsive to locating the unused loan page, associate a respective GPA with the unused loan page and place a second fresh page, wherein each respective GPP of the first group having an inflated state is temporarily backed by a respective loan page.

15. The system of claim 14, wherein the hypervisor is configured to register a fault thread as a fault handler for the guest memory.

16. The system of claim 14, wherein the hypervisor is configured to:
discard a first loan page of the at least one loan page responsive to each loan page being in-use, thereby transitioning the first loan page from in-use to unused.

17. The system of claim 16, wherein the first loan page is the least recent loan page to be associated with a respective GPA.

18. The system of claim 14, further comprising at least one para-virtualized memory device, and wherein the guest memory corresponds to device memory.

19. The system of claim 14, wherein the guest OS configured to:
- inflate a respective GPP of the plurality of GPPs, and
- deflate a respective GPP of the plurality of GPPs.

20. The system of claim 19, wherein the hypervisor is configured to:
- discard memory corresponding to the inflated GPP, such that a future access of a memory location associated with the inflated GPP results in a page fault; and
- update a bitmap each for each instance the guest inflates or deflates a respective GPP to indicate an updated state for the respective GPP in the bitmap.

\* \* \* \* \*